United States Patent
Hirata et al.

(10) Patent No.: US 6,665,716 B1
(45) Date of Patent: Dec. 16, 2003

(54) METHOD OF ANALYZING DELAY FACTOR IN JOB SYSTEM

(75) Inventors: Toshiaki Hirata, Kashiwa (JP); Yasuo Takenaka, Yokohama (JP); Eiji Matsumura, Yokohama (JP); Shigeru Miyake, Tokyo (JP); Satoshi Miyazaki, Yamato (JP); Akihiro Urano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/386,439

(22) Filed: Aug. 31, 1999

(30) Foreign Application Priority Data

Dec. 9, 1998 (JP) .......................... 10-349669
Jul. 12, 1999 (JP) .......................... 11-197763

(51) Int. Cl.[7] .......................................... G06F 15/173
(52) U.S. Cl. .................. 709/224; 709/101; 709/103; 709/223; 709/225; 714/37; 714/47; 711/170; 711/203
(58) Field of Search ................ 709/101, 103, 709/223–225; 711/170, 203; 714/37, 47; 706/19, 25

(56) References Cited

U.S. PATENT DOCUMENTS

| | | | | |
|---|---|---|---|---|
| 5,353,422 A | * | 10/1994 | Kobayashi et al. | ......... 711/170 |
| 5,442,730 A | * | 8/1995 | Bigus | .......................... 706/19 |
| 5,465,354 A | * | 11/1995 | Hirosawa et al. | ........... 709/106 |
| 6,041,425 A | * | 3/2000 | Kokunishi et al. | ............. 714/37 |
| 6,076,174 A | * | 6/2000 | Freund | ......................... 714/47 |
| 6,170,010 B1 | * | 1/2001 | Hirata et al. | ................. 709/223 |
| 6,219,701 B1 | * | 4/2001 | Hirata et al. | ................. 709/223 |
| 6,263,359 B1 | * | 7/2001 | Fong et al. | .................. 709/103 |
| 6,289,368 B1 | * | 9/2001 | Dentler et al. | .............. 709/101 |
| 6,345,351 B1 | * | 2/2002 | Holmberg | ................... 711/203 |

FOREIGN PATENT DOCUMENTS

| | | |
|---|---|---|
| JP | 8137810 | 5/1996 |
| JP | 9311795 | 12/1997 |
| JP | 1011406 | 1/1998 |
| JP | 10161987 | 6/1998 |

* cited by examiner

Primary Examiner—Hosain T. Alam
Assistant Examiner—Thu Ha Nguyen
(74) Attorney, Agent, or Firm—Antonelli, Terry, Stout & Kraus, LLP

(57) ABSTRACT

A delay factor in a processing in a job system in which an ordered series of jobs are executed in computers assigned to respective jobs, is efficiently detected, and the delay factor is analyzed in detail by associating it with load information of the computers and a network. An administrative manager computer 201 collects a history of executing a job from each job executing computer 202, and refers to a history of each job, one by one from a job executed later to a job executed earlier, until no delay is detected in a job, for judging a cause of delay in each job. Further, with respect to a job in which delay is detected, load statuses of the other jobs or applications in the computer in which said job is in execution are compared with said job and displayed.

20 Claims, 21 Drawing Sheets

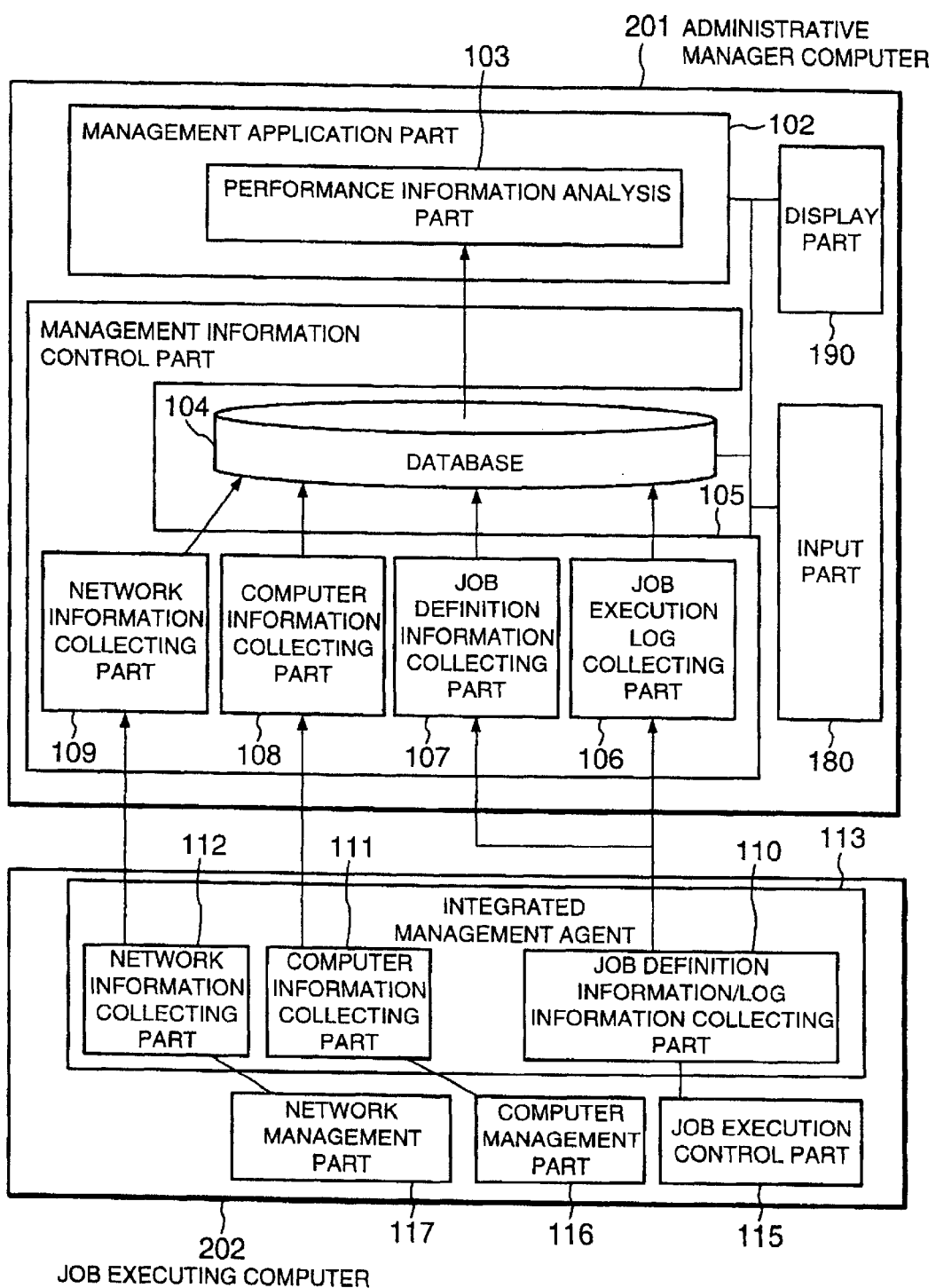

FIG.4A

JOB NET DEFINITIONS

| OPERATIONAL DEFINITION IDENTIFIER | JOB NET NAME | STARTING DAY OF THE WEEK/ STARTING DAY | START TIME | COMPONENT JOBS DEFINITION |
|---|---|---|---|---|
| 1101 | JOB NET A | MONDAY - FRIDAY | 9:30 | JOB 1, {JOB 2, JOB 3}, JOB 4, JOB 5 |
| 1102 | JOB NET B | MONDAY - FRIDAY | 10:30 | JOB 1, JOB 2, JOB 3 |

FIG.4B

DEFINITION OF EACH JOB CONSTITUTING A JOB NET

JOB NET A

| JOB NAME | PLANNED START TIME | PLANNED END TIME | OPERATIONAL DEFINITION IDENTIFIER | COMPUTER NAME | ALTERNATIVE CANDIDATE NAME | EXECUTABLE FILE NAME | PORT NUMBER |
|---|---|---|---|---|---|---|---|
| JOB 1 | 9:30 | 10:00 | 1101-1 | COMPUTER A | COMPUTER E | abc1.exe | 2001 |
| JOB 2 | 10:00 | 10:30 | 1101-2 | COMPUTER B | COMPUTER F | abc2.exe | 2002 |
| JOB 3 | 10:00 | 10:30 | 1101-3 | COMPUTER C | — | abc3.exe | 2003 |
| JOB 4 | 10:30 | 11:00 | 1101-4 | COMPUTER D | — | abc4.exe | 2004 |
| JOB 5 | 11:30 | 12:30 | 1101-5 | COMPUTER E | COMPUTER A | abc5.exe | 2005 |

JOB NET B

| JOB NAME | PLANNED START TIME | PLANNED END TIME | OPERATIONAL DEFINITION IDENTIFIER | COMPUTER NAME | ALTERNATIVE CANDIDATE NAME | EXECUTABLE FILE NAME | PORT NUMBER |
|---|---|---|---|---|---|---|---|
| JOB 1 | 10:00 | 10:30 | 1102-1 | COMPUTER B | COMPUTER F | def1.exe | 3001 |
| JOB 2 | 10:30 | 11:00 | 1102-2 | COMPUTER E | COMPUTER A | def2.exe | 3002 |
| JOB 3 | 11:00 | 11:30 | 1102-3 | COMPUTER C | COMPUTER D | def3.exe | 3003 |

→ : EXECUTION SEQUENCE OF JOBS

FIG.7

LOG INFORMATION  1301

| EVENT LOG IDENTIFIER | COMPUTER NAME | TIME | EVENT LOG CLASS | OPERATIONAL DEFINITION IDENTIFIER | DETAILED INFORMATION |
|---|---|---|---|---|---|
| 1001 | COMPUTER A | 6/16 9:30 | START OF JOB NET A | 1101 | NORMAL START-UP |
| 1002 | COMPUTER A | 6/16 9:30 | START OF JOB NET A - JOB 1 | 1101-1 | NORMAL START-UP |
| 1003 | COMPUTER A | 6/16 10:00 | END OF JOB NET A - JOB 1 | 1101-1 | NORMAL END |
| 1002 | COMPUTER B | 6/16 10:00 | START OF JOB NET A - JOB 2 | 1101-2 | NORMAL START-UP |
| 1003 | COMPUTER B | 6/16 10:34 | END OF JOB NET A - JOB 2 | 1101-2 | NORMAL END |
| 1002 | COMPUTER C | 6/16 10:00 | START OF JOB NET A - JOB 3 | 1101-3 | NORMAL START-UP |
| 1003 | COMPUTER C | 6/16 10:30 | END OF JOB NET A - JOB 3 | 1101-3 | NORMAL END |
| 1002 | COMPUTER D | 6/16 10:39 | START OF JOB NET A - JOB 4 | 1101-2 | NORMAL START-UP |
| 1003 | COMPUTER D | 6/16 11:09 | END OF JOB NET A - JOB 4 | 1101-2 | NORMAL END |
| 1002 | COMPUTER E | 6/16 11:09 | START OF JOB NET A - JOB 5 | 1101-2 | NORMAL START-UP |
| 1003 | COMPUTER E | 6/16 11:40 | END OF JOB NET A - JOB 5 | 1101-2 | NORMAL END |

FIG.12A

FAULT MONITORING SCREEN

901

| IMPORTANCE | DATE | TIME | SOURCE OF NOTIFICATION | MESSAGE |
|---|---|---|---|---|
| NORMAL | 97/6/19 | 9:02:20 | COMPUTER A | POWER IS TURNED ON. |
| NORMAL | 97/6/19 | 9:30:00 | COMPUTER A | JOB NET A IS STARTED. |
| NORMAL | 97/6/19 | 11:40:00 | COMPUTER E | JOB NET A IS ENDED. |
| ERROR | 97/6/19 | 9:13:30 | MANAGER COMPUTER | EXECUTION DELAY OF JOB NET A IS DETECTED. |

DETAIL OF ANALYSIS RESULT

903

| IMPORTANCE | DATE | TIME | COMPUTER | JOB/JOB NET NAMES | DELAY TIME | CUMULATIVE DELAY TIME | DELAY SOURCE |
|---|---|---|---|---|---|---|---|
| NORMAL | 97/6/19 | 9:30:00 | COMPUTER A | JOB NET A - JOB 1 | 0 | 0 | ... |
| ERROR | 97/6/19 | 10:00:00 | COMPUTER B | JOB NET A - JOB 2 | 4 | 4 | COMPUTER |
| NORMAL | 97/6/19 | 10:00:00 | COMPUTER C | JOB NET A - JOB 3 | 0 | 0 | ... |
| ERROR | 97/6/19 | 10:39:00 | COMPUTER D | JOB NET A - JOB 4 | 5 | 9 | NETWORK |
| NORMAL | 97/6/19 | 11:09:00 | COMPUTER E | JOB NET A - JOB 5 | 1 | 10 | COMPUTER |

DISPLAY EXAMPLE: JOB 4 IS A CAUSE OF DELAY
(JOB 4 IS HIGHLIGHTED)

DISPLAY EXAMPLE OF CONFIGURATION OF COMPUTERS
(COMPUTER IN EXECUTION OF JOB 4 IS HIGHLIGHTED)

DISPLAY EXAMPLE: TRANSFER BETWEEN JOB 2 AND JOB 4 IS A CAUSE OF DELAY

DISPLAY EXAMPLE OF CONFIGURATION OF COMPUTERS (COMPUTER B IN EXECUTION OF JOB 2 AND COMPUTER D IN EXECUTION OF JOB 4 ARE HIGHLIGHTED)

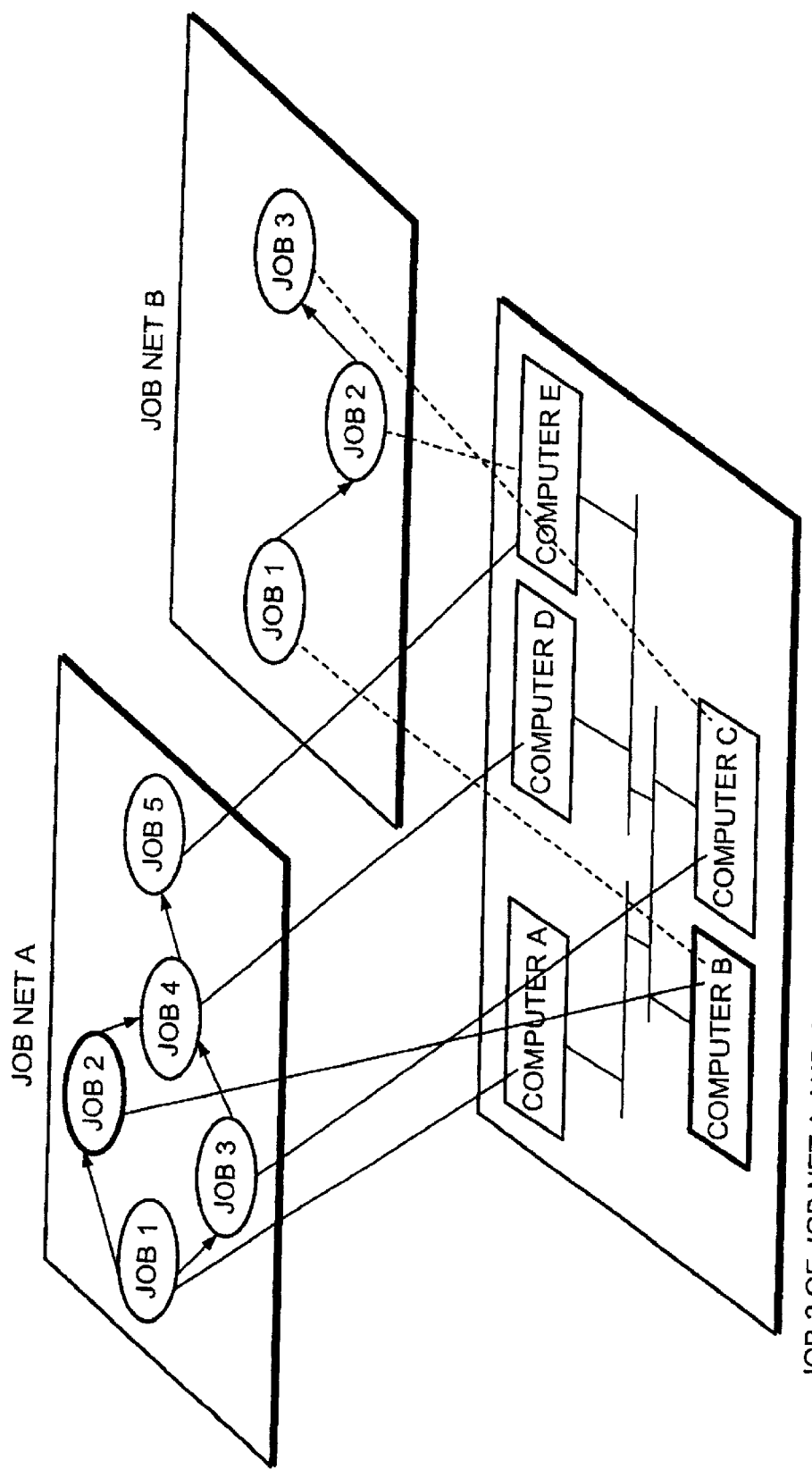

FIG.20

| LOGICAL CHANNEL NAME | SOURCE - DESTINATION | NETWORK NAME |
|---|---|---|
| | JOB NET/JOB NAMES: JOB NET A/JOB 2 | |
| 2001-4000 | COMPUTER B - COMPUTER C | SEGMENT A |
| 3001-4005 | COMPUTER B - COMPUTER F | SEGMENT B |

METHOD OF ANALYZING DELAY FACTOR IN JOB SYSTEM

BACKGROUND OF THE INVENTION

1. Field of the Invention

The present invention relates to a technique of analyzing cause of delay in a single business processing in a job system in which a computer system comprising a plurality of computers connected through a network is used, the computers are respectively assigned to a series of jobs constituting the single business processing, and the computers, to which the jobs in question are assigned, are made to execute respective jobs in a predetermined order, the analysis being carried out associating the cause with processes on the computers and traffic of a network used by the processes.

2. Description of Related Art

As a job system using a computer system comprising a plurality of computers connected through a network, there is known one in which, taking resources and a load of each computer into consideration, jobs are dynamically assigned to respective computers to be executed by them, so that delay in processing is not generated, as described in Japanese Unexamined Patent Laid-Open Nos. 10-11406, 10-161987, and 9-311795.

Further, as a job system using a computer system comprising a plurality of computers connected through a network, there is known one in which, a computer is assigned to each of a series of jobs constituting one business processing, so that the jobs are executed in predetermined order by respective computers to which those jobs are assigned.

On the other hand, as a technique of analyzing a location of a bottleneck to performance, in a computer system comprising a plurality of computers connected through a network, there is known a technique in which pieces of load information about component devices constituting the computer system are collected, and a bottleneck component device is judged from the collected information, as described in Japanese Unexamined Patent Laid-Open No. 8-137810.

Now when cause of delay in a single business processing is to be detected in the above-mentioned job system in which computers are respectively assigned to a series of jobs constituting so that the single business processing and the jobs are executed in predetermined order by respective computers to which those jobs are assigned, it is insufficient to judge a component device that is a bottleneck of performance of the computer system, applying the technique of the above-mentioned Japanese Unexamined Patent Laid-Open No. 8-137810. It is because delay in a business processing in such a job system is generated from relation between component devices of the computer system and jobs. Thus its cause should be detected taking account of the relation between the component devices of the computer system and the jobs, more closely, to be able to decide effective measures to get rid of generated delay.

Further, the job system described in Japanese Unexamined Patent Laid-Open Nos. 10-11406, 10-161987, and 9-311795 is one in which taking resources and a load of each computer into consideration, jobs are dynamically assigned to respective computers to be executed by them, so that delay in processing is not generated. Thus, in a job system in which a system designer assigns computers to a series of jobs and makes the jobs be executed in a predetermined order by respective computers to which the jobs in question are assigned, it is not supposed to present necessary material for reconsideration when the system designer reconsiders assignment of jobs to respective computers.

SUMMARY OF THE INVENTION

Accordingly, an object of the present invention is to effectively detect a causative location, in relation to loads of the computers, network traffic, and the jobs.

Further, another object of the present invention is to present necessary information for reconsideration when the assignment of jobs to respective computers constituting the above-mentioned job system is reconsidered.

To attain the above objects, the present invention provides a method of analyzing a delay factor, for analyzing a delay factor in processing a job net in a job system that uses a computer system having a plurality of computers connected, for example, through a network, assigns the computers respectively to a series of jobs constituting the job net, and executes the jobs in a predetermined order by the respective computers assigned to the jobs, to process the job net, wherein the method comprises:

a collecting step in which history information expressing history of execution of a job from each computer is collected; and an analyzing step in which a job and a part of the computer system that became delay factors in processing the job net is decided, in accordance with a form of delay in execution of each job expressed in the history, in relation to an execution schedule of each job expressed in definition information defined in advance, and in accordance with computers assigned to each job.

Here, a job net implies a unified processing (for example, business processing) that is constituted by a series of jobs and processed by the job system.

According to thus-described method, it is possible to extract a part of the computers, which became a delay factor in processing the job net, in relation to the jobs.

In detail, the analyzing step comprises:

a first step in which a computer assigned to a job whose execution time exceeds a planned execution time by more than a predetermined degree is extracted as a delay factor in processing the job net; and a second step in which, with respect to a job whose execution end time is latest among jobs executed just prior to a job whose execution start time is delayed from a planned start time by more than a predetermined degree, when the execution end time is not delayed from a planned end time by more than a predetermined degree, the part of the computer system that undertakes transfer between the job whose execution start time is delayed from the planned start time by more than the predetermined degree and the job executed just prior to the job in question is extracted as a delay factor in processing the job net.

By doing this, it is possible to present a job that became a delay factor in processing a job net, and at the same time, to distinguish a case where that factor was caused by a computer, and a case where a part of the above-mentioned computer system that undertakes transfer between two jobs.

Further, to attain the above objects, the present invention provides a method of analyzing a delay factor, for analyzing a delay factor in processing a job net in a job system that uses a computer system having a plurality of computers connected through a network, assigns the computers respectively to a series of jobs constituting the job net, and executes the jobs in a predetermined order by the respective computers assigned to the jobs, to process the job net, wherein the method comprises:

a collecting step in which history information from each computer is collected, the history information being information that can specify an execution start time at which the computer started execution of a job, and an execution time which the computer required to execute the job, from each computer; and an analyzing step in which the delay factor in processing the job net is decided by comparing definition information, which is defined in advance and can specify a planned start time, i.e., a planned time at which execution of each job is started, and a planned execution time, i.e., a planned time required for execution of each job, with the history information collected, and the analyzing step comprises:

a first step, in which a specific job is noticed in accordance with a predetermined rule;

a second step, for repeating a process in which, when an execution start time of the noticed job is delayed from a planned start time of the job by more than a predetermined degree, a job executed just prior to the noticed job in the order is noticed; and a third step, in which, with regard to each noticed job, when an execution time of the job exceeds a planned execution time of the job by a predetermined degree, the job is extracted as the delay factor in processing the job net.

According to thus-described method, when an execution start time of the noticed job does not exceed the planned start time by more than the predetermined degree, it is possible to exclude jobs earlier than the noticed job in that order, from the processing of searching a delay factor, judging that the delay factor does not exist in those jobs. Thus, a delay factor can be searched more efficiently.

Further, to attain the above objects, the present invention provides a method of analyzing a delay factor, for analyzing a delay factor in processing a job net in a job system that uses a computer system having a plurality of computers connected through a network, assigns the computers respectively to a series of jobs constituting the job net, and executes the jobs in a predetermined order by the respective computers assigned to the jobs, to process the job net, wherein the method comprises:

a collecting step in which history information is collected from each computer, the history information being information that can specify an execution start time at which the computer started execution of a job, an execution end time at which the computer ended the execution of the job, and an execution time which the computer required to execute the job, from each computer; and an analyzing step in which the delay factor in processing the job net is decided by comparing definition information, which is defined in advance and can specify a planned start time, i.e., a planned time at which execution of each job is started, a planned end time, i.e., a planned time at which execution of each job is ended, and a planned execution time, i.e., a planned time required for execution of each job, with the history information collected, and the analyzing step comprises:

a first step, in which a specific job is noticed in accordance with a predetermined rule;

a second step, for repeating a process in which, among jobs executed just prior to the noticed job in the order, jobs whose execution end times stand within n-th (n: a natural number) from the latest are extracted and noticed; and a third step, in which, with regard to each noticed job, when an execution time of the job exceeds a planned execution time of the job by a predetermined degree, the job is extracted as the delay factor in processing the job net.

According to thus-described method, it is judged that, among the jobs executed just prior to the noticed job in that order, jobs having later execution end times become bottlenecks affecting the delay as a whole. Among the jobs executed just prior to the noticed job, jobs having earlier execution end times are judged not to be a delay factor, and can be excluded from the processing of searching a delay factor. Thus, it is possible to efficiently search a delay factor.

Further, to attain the above objects, the present invention provides a method of analyzing a delay factor, for analyzing a delay factor in processing a job net in a job system that uses a computer system having a plurality of computers connected through a network, assigns the computers respectively to a series of jobs constituting the job net, and executes the jobs in a predetermined order by the respective computers assigned to the jobs, to process the job net, wherein the method comprises:

a collecting step in which history information is collected from each computer, the history information expressing a history of executing a job which constitutes the job net and is assigned to the computer;

an analyzing step in which a job and a computer assigned to the job that became the delay factors in processing the job net are decided, in accordance with a form of delay in execution of each of the series of jobs constituting the job net, expressed by the history information collected, in relation to an execution schedule of each of the series of jobs constituting the job net, expressed in definition information defined in advance, and in accordance with computers assigned to each of the series of jobs;

a computer utilization status acquiring step in which a resource utilization status owing to each process executed in the computer to which the job became the delay factor in processing the job net is assigned is acquired, from the computer;

a process specifying step in which a process as an execution form of the job that became the delay factor in processing the job net is specified, on the computer to which the job is assigned, and a computer utilization status of the computer owing to the process of the job that became the delay factor in processing the job net is specified, among resource utilization statuses owing to respective processes acquired from the computer to which the job that became the delay factor in processing the job net is assigned; and a computer utilization status displaying step in which a resource utilization status of the computer to which the job that became the delay factor in processing the job net is assigned is displayed, owing to each process, acquired from the computer, distinguishing, at least, the resource utilization status of the computer owing to the process specified with respect to the job that became the delay factor in processing the job net.

According to thus-described method, since a resource utilization status of a computer to which a job detected as a factor of delay in processing a job net is assigned is displayed, distinguishing, at least, the resource utilization status owing to a process of the job, it is easy to understand if the job presses a load of the computer, or another job or application program presses the load of the computer. In other words, it is possible to present necessary information when assignment of jobs to respective computers constituting a job system is to be reconsidered.

Further, to attain the above objects, the present invention provides a method of analyzing a delay factor, for analyzing a delay factor in processing a job net in a job system that uses a computer system having a plurality of computers connected through a network, assigns the computers respectively to a series of jobs constituting the job net, and executes the jobs in a predetermined order by the respective computers assigned to the jobs, to process the job net, wherein the method comprises:

a collecting step in which history information is collected from each computer, the history information expressing a history of executing a job which constitutes the job net and is assigned to the computer; and an analyzing step in which a job and a computer assigned to the job that became the delay factors in processing the job net are decided, in accordance with a form of delay in execution of each of the series of jobs constituting the job net, expressed by the history information collected, in relation to an execution schedule of each of the series of jobs constituting the job net, expressed in definition information defined in advance, and in accordance with computers assigned to each of the series of jobs;

a network specifying step in which a process as an execution form of the job that became the delay factor in processing the job net is specified, on the computer to which the job is assigned, and a logical channel used by the specified process and a part of the network to which the logical channel is set are specified;

a traffic status collecting step in which a traffic status in the specified network is collected, for each logical channel set to the network; and a traffic status displaying step in which the traffic status collected for the each logical channel is displayed, so as to, at least, distinguish a traffic status of the logical channel used by the process specified to the job that became the delay factor in processing the job net.

Here, the logical channel used by the specified process implies a logical channel on the network, which is set between the process and an application, when the job corresponding to the process requests processing by that application running on a computer different from a job executing computer that executes the process.

According to thus-described method, a traffic status of a network to which a logical channel used by a process of a job detected as a delay factor in processing a job net is set is displayed, distinguishing, as least, a traffic status of a logical channel used by the process of the job. Thus, it is easy to understand if the job presses a load of the network, or another job or application presses the load of the network. In other words, it is possible to present necessary information when assignment of jobs to respective computers constituting a job system is to be reconsidered.

BRIEF DESCRIPTION OF THE DRAWINGS

FIG. 3 is a block diagram showing a functional configuration of an administrative manager computer and a job executing computer relating to the embodiment of the present invention;

FIGS. 4A and 4B show job net definitions and jobs relating to the embodiment of the present invention;

FIG. 7 shows log information relating to the embodiment of the present invention;

FIGS. 12A and 12B show a display screen for displaying a delay factor in execution of a job net relating to the embodiment of the present invention;

FIG. 15 show a state in which, in the job system shown in FIG. 1, the job net A and the job net B are executed in accordance with the definitions of FIG. 4;

FIG. 20 shows a list of logical channels displayed in the step 2102 of FIG. 19;

DETAILED DESCRIPTION OF THE PREFERRED EMBODIMENTS

In the following, one embodiment of the present invention will be described.

Figure 1:
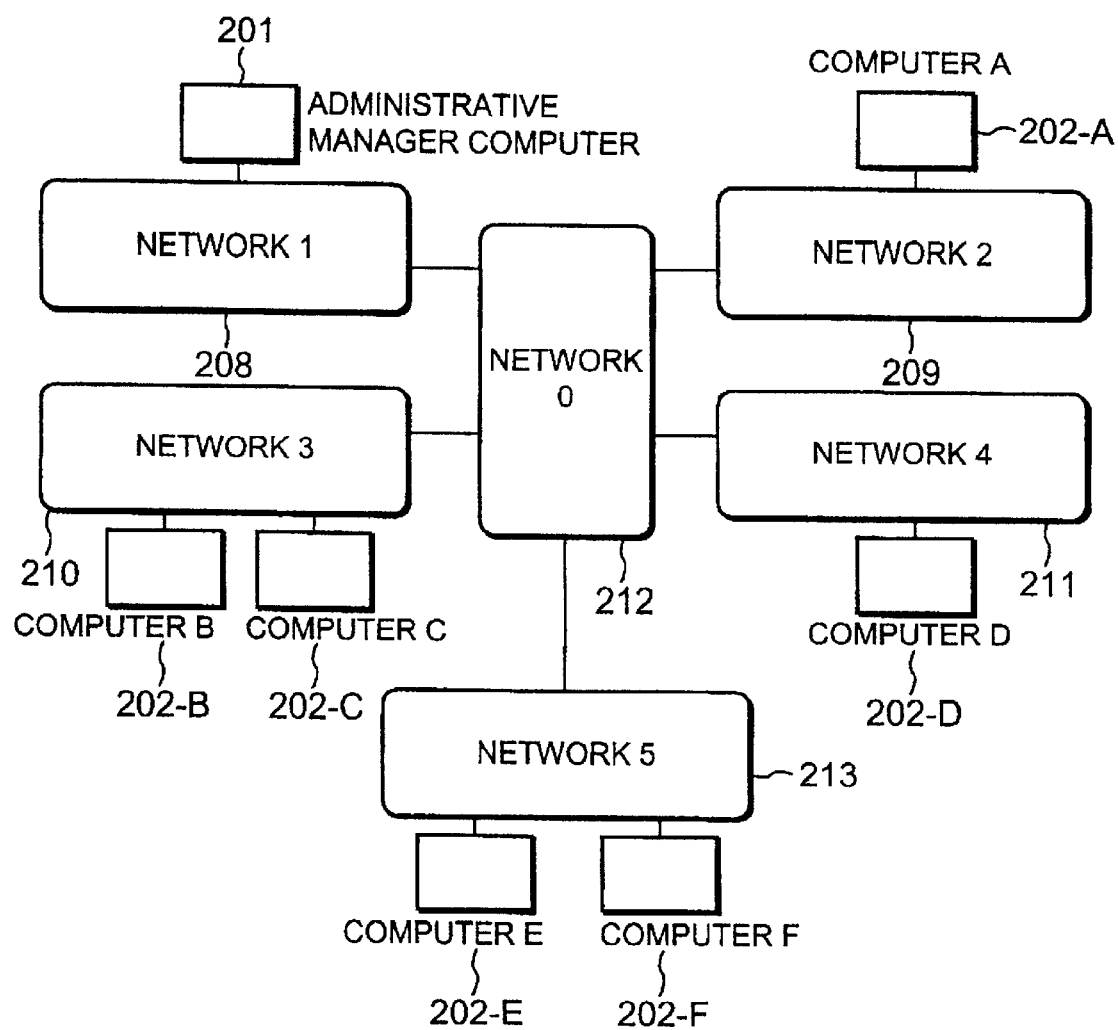
FIG. 1 is a block diagram showing a configuration of a job system relating to an embodiment of the present invention.

First, FIG. 1 shows a configuration of a job system relating to the present embodiment.

As shown in the figure, the job system relating to the present embodiment comprises a network that is constructed by connecting a trunk network, i.e., a network (0) 212, with branch networks, i.e., a network (1) 208, a network (2) 209, a network (3) 210, a network (4) 211, and a network (5) 213, this network being connected with an administrative manager computer 201, a job executing computer (A) 202-A, a job executing computer (B) 202-B, a job executing computer (C) 202-C, a job executing computer (D) 202-D, a job executing computer (E) 202-E, and a job executing computer (F) 202-F.

In the following, when a common matter is described with respect to the job executing computer (A) 202-A, the job executing computer (B) 202-B, the job executing computer (C) 202-C, the job executing computer (D) 202-D, the job executing computer (E) 202-E, and the job executing computer (F) 202-F, they are referred to simply as the job executing computers 202, putting them together.

Figure 2:
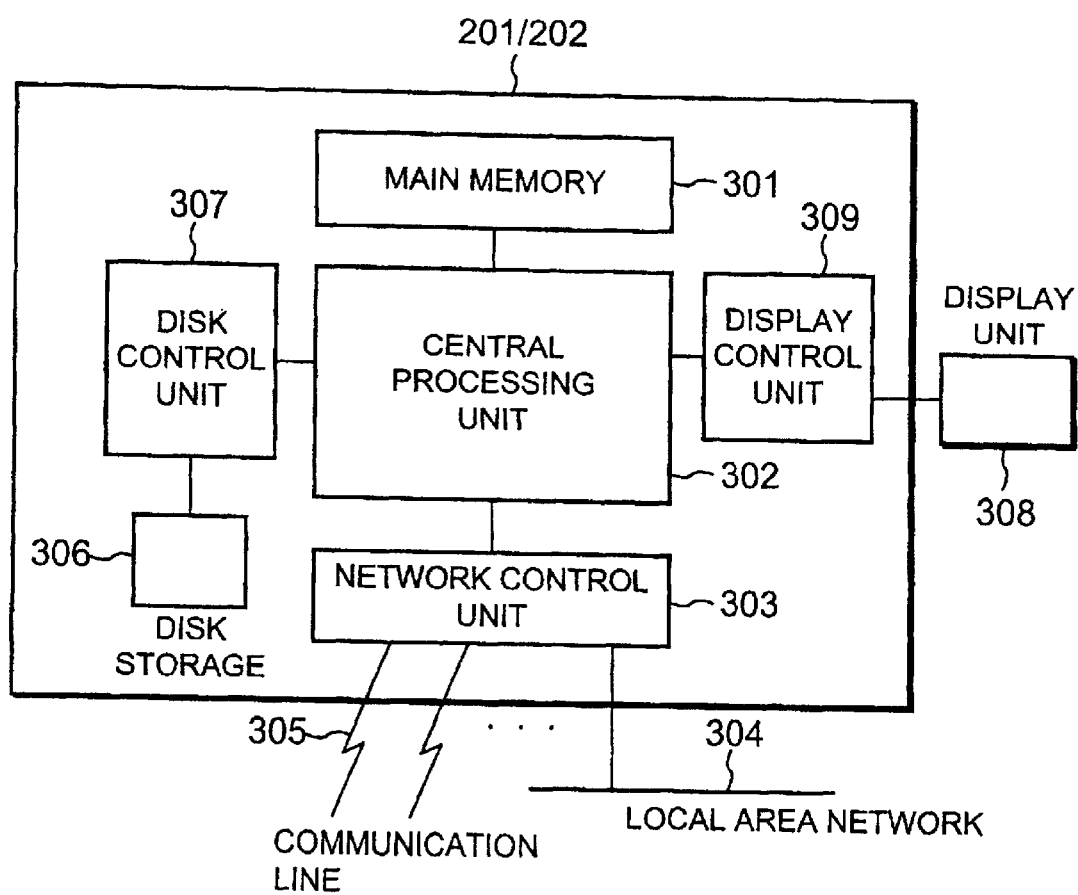
FIG. 2 is a block diagram showing a hardware configuration of an administrative manager computer and a job executing computer relating to the embodiment of the present invention.

Here, as the administrative manager computer 201 and job executing computer 202, may be used, for example, an electronic computer 201/202 shown in FIG. 2, comprising a central processing unit 302 for executing instructions of various operations etc., a main memory 301 for storing data required for those operations, a network control unit 303 for controlling data input-output to communication line 305 and to a local area network 304, a disk storage 306, a disk control unit 307 for controlling input-output of the disk storage 306, a display unit 308, and a display control unit 309 for controlling input-output of the display unit 308.

The central processing unit 302 executes a program loaded into the main memory 301. The program to be loaded into the main memory 301 is stored in the disk storage 306 in advance, loaded into the main memory 301 as the need arises, and executed by the central processing unit 302. Or, a program is directly loaded into the main memory 301 from a portable storage medium (not shown) such as a CD-ROM via a portable disk recording medium reader (not shown) as the need arises, and then is executed by the central processing unit. Or, a program is once installed into the disk storage 306 from a portable disk storage via a portable disk recording medium reader, is loaded into the main memory 301 as the need arises, and executed by the central processing unit 302. Or, a program is directly loaded into the main memory 301 from the communication line 305 or local area network 304 via the network control unit 303, or once downloaded into the disk storage 306 and thereafter loaded into the main memory 301, and then executed by the central processing unit 302.

Next, FIG. 3 shows a configuration of functional parts that realizes as processes on the administrative manager computer 201 and the job executing computer 202 by a program in the central processing unit 302.

Namely, as shown, the administrative manager computer 201 comprises, as its functional parts: a management application part 102 for processing collected management information; a database 104 for storing the management information; a management information control part 105, which collects the management information from the job executing computers 202, stores the information into the database 104 and searches and extracts the information stored in the database 104 by request of the management application part 102; an input part 180; and a display part 190. The management application part 102 has a performance analysis part 103 that performs processing such as analysis of the collected management information and detection of cause of a bottleneck. The management information control part 105 comprises: a job execution log collecting part 106 for collecting results of job execution from the job executing computers 202; a job definition information collecting part 107 for collecting job definition information possessed by the job executing computers 202; a computer information collecting part 108 for collecting computer information indicating a CPU load, a memory utilization factor, or the like of each process executed in a computer from each job executing computer 202; and a network information collecting part 109 for collecting network information indicating traffic (specified by the number of packets or bytes transmitted per unit time) of each logical channel (specified by a combination of a communication port specifying an address of a process and a communication port specifying an address of a communication partner of the process in question through the network) on a network used by each process executed by a computer from each job executing computer 202.

On the other hand, the job executing computer 202 comprises, as its functional parts: a job execution control part 115 for executing job; a computer management part 116, which measures a CPU load, a memory utilization factor, or the like for each process executed in its own computer and generates computer information to be sent to the administrative manager computer 201; a network management part 117, which measures traffic of the network and the like for each logical channel on the network used by each process executed in its own computer, and generates network information to be sent to the administrative manager computer 201; and an integrated management agent 113, which collects job execution logs and the measured management information and sends them to the administrative manager computer 201. The integrated management agent 113 comprises: a job definition information/log information collecting part 110 for treating the job definition information and log information expressing results of executing the job; a computer information collecting part 111 for treating the computer information; and a network information collecting part 112 for treating the network information. Here, the measurement of traffic for each logical channel by the network management part 117 can be performed by investigating destination and source addresses attached to a header of a packet sent and received in the network control unit 303 via the network, and by investigating the number of packets or bytes sent and received for each logical channel specified by the destination and source addresses.

Next, business processing carried out in the present job system will be described.

Each business processing carried out in the present job system is constituted by a series of jobs. In the following, a series of jobs constituting a single business processing is referred to as a job net.

Now, in the present embodiment, information shown in FIG. 4A is defined for each job net.

Namely, for each job net, there are defined "Operational Definition Identifier" for identifying the definition, "Job Net Name" for identifying a job net, "Starting Day of the Week/Starting Day" and "Start time" specifying a planned start of execution of the job net, and "Component Jobs Definition" defining execution sequence of jobs in the job net, those jobs constituting the job net. For example, "Component Jobs Definition" shown in FIG. 4A shows that the job net A consists of the jobs 1–5, the job 1 is executed, then, the jobs 2 and 3 are executed in parallel from the viewpoint of order, then, at the time of finishing both jobs 2 and 3, the job 4 is executed, and finally, the job 5 is executed. Also, it shows that the job net B consists of the jobs 1–3, and the jobs 1–3 are executed in turn.

Further, in the present embodiment, for each job net defined in the job net definitions, information shown in FIG. 4B is defined to each of jobs constituting the job net in question.

Namely, for each job, there are defined "Job Name" for identifying the job, "Planned Start time", i.e., planned start of executing the job, "Planned End Time", i.e., planned end of executing the job, "Operational Definition Identifier" for identifying the definition, "Computer Name" specifying a job executing computer 202 for executing the job in question, and "Executable File Name" specifying an executable file for executing the job in question. In addition, for each job, there are defined "Port Number" specifying a communication port used for communication by the job in question when an executable file specified by "Executable File Name" is executed, and "Alternative Candidate Name" specifying a job executing computer 202 if that job executing computer 202, which is different from the job executing computer 202 specified by "Computer Name", can serve as a job executing computer executing the job in question. Further, as "Operational Definition Identifier" among the definitions of a job, is used "Operational Definition Identifier" of the job net to which the job in question belongs, being added with a branch number, so that the definition of the job and the definition of the job net to which the job in question belongs can be easily associated with each other.

Here, when a start time and an end time of a job have appropriate values in the log information shown in FIG. 7 which is described below and indicates results of executing jobs, the start time and the end time of the can be applied to the planned start time and the planned end time of the job used for detecting delay in FIG. 4, in order to save labor of setting.

Figure 5:
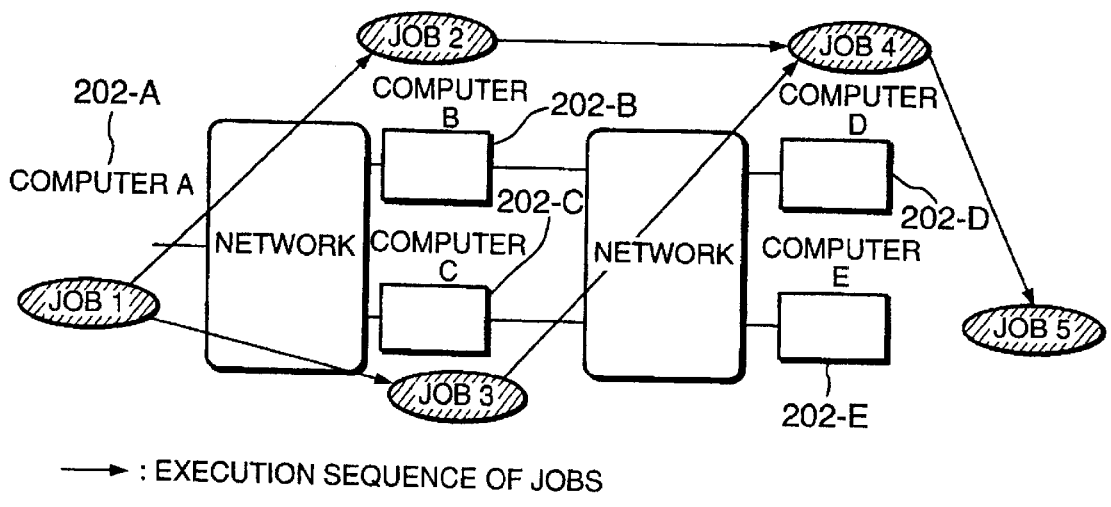
FIG. 5 shows a state of executing jobs in a job system relating to the embodiment of the present invention.

FIG. 5 shows a state of executing the job net A in accordance with the definition shown in FIG. 4.

First, the job executing computer (A) 202-A executes the job 1 at 9:30 from Monday through Friday, in accordance with the definition of the job net in FIG. 4A and the definition of the job 1 in FIG. 4B. The job executing computer (B) 202-B awaits an end of the job 1 to execute the job 2, in accordance with the definition of the job net in FIG. 4A and the definition of the job 2 in FIG. 4B. Similarly, each of the job executing computers (C) 202-C–(E) 202-E executes an assigned job when the previous job in the execution sequence ends, in accordance with the definition of the job net in FIG. 4A and a definition of a job assigned to itself in FIG. 4B.

As a result, as shown in FIG. 5, the job 1 is executed first on the job executing computer (A) 202-A; then, after the end of the job 1, the jobs 2 and 3 are executed respectively on the job executing computers (B) 202-B and (C) 202-C in parallel from the viewpoint of order; then, after the end of both jobs 2 and 3, the job 4 is executed on the job executing computer (D) 202-D; and, after the end of the job 4, the job 5 is executed on the job executing computer (E) 202-E.

Here, it is the job execution control part 115 of each job executing computer 202 that controls thus-described execution of a job net. With regard to the execution control of a job net by the job execution control part 115 of each job executing computer 202, there are two modes as will be described in the following.

(1) First Mode

Out of the definition information shown in FIG. 4, the job execution control part 115 of each job executing computer 202 holds a part relating to a job assigned to its own job executing computer 202 as job definition information, to control execution of the job assigned to its own job executing computer 202.

In this first mode, the job execution control part 115 of each job executing computer 202 gives notice of an end of execution of the job assigned to its own job executing computer 202 as an event to a job execution control part 115 of another job executing computer 202 to which a job to be executed next to the job in question is assigned, if there exists any such job executing computer 202. In accordance with the notice of this event and the job definition information held, the job execution control part 115 of each job executing computer 202 controls execution of the job assigned to its own job executing computer 202, in the above-described sequence.

(2) Second Mode

Out of the job executing computers 202, a job execution control part 115 of one specific job executing computer 202 performs control of execution of a job net in a centralized manner. The job execution control part 115 of that one specific job executing computer 202 holds the definition information shown in FIG. 4 as job definition information. However, "Operational Definition Identifier" of each job is held by a job executing computer 202 to which that job is assigned, in order to give notice of log information described below.

In this second mode, when a job executing computer 202 ends execution of a job assigned to itself, its job execution control part 115 gives notice of the end of the job to the job execution control part 115 of the above-mentioned one specific job executing computer 202. The jobs are executed in the following way. Namely, the job execution control part 115 of the above-mentioned one specific job executing computer 202 successively sends events that respectively causes job executing computers 202 to execute their assigned jobs in the above-described sequence. Those events are sent to respective job execution control parts of the job executing computers 202 in accordance with the job definition information held by that one specific job executing computer and notices of job ends received from respective job execution control parts 115 of the job executing computers 202. Among the job executing computers 202 which receive those events, may be included that one specific job executing computer 202.

In both first and second modes described above, the job execution control part 115 of each job executing computer 202 outputs log information expressing history of job execution.

In the following, operation of analyzing cause of delay in a business processing in thus-described job system will be described.

First, operation of the administrative manager computer 201 that collects information for analysis from each job executing computer 202 will be described.

Figure 6:
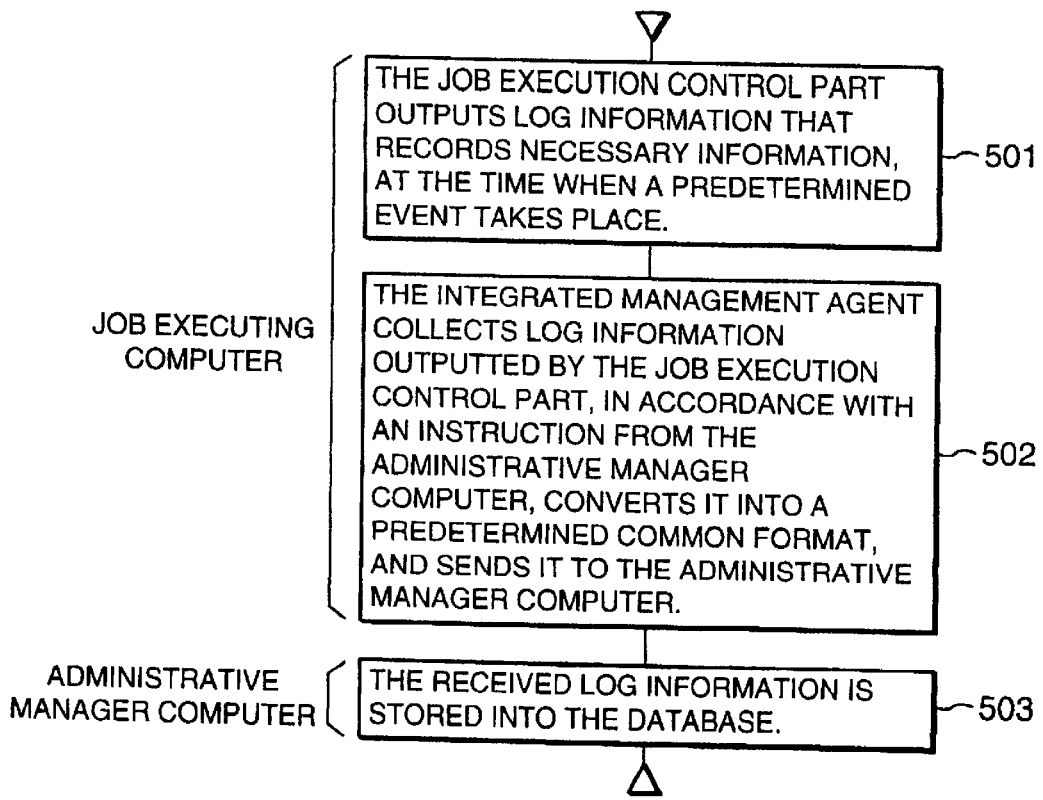
FIG. 6 is a flowchart showing a procedure for collecting log information relating to the embodiment of the present invention.

FIG. 6 shows a procedure for collecting the above-mentioned log information from each job executing computers 202 to the administrative manager computer 201.

The job execution control part 115 of each job executing computer 202 outputs log information that records necessary information, at the time when a predetermined event takes place (Step 501). The job definition information/log information collecting part 110 of the integrated management agent 113 collects the log information outputted by the job execution control part 115, in accordance with an instruction from the administrative manager computer 201, converts it into a predetermined common format for example, and sends it to the administrative manager computer 201 (Step 502).

The job execution log collecting part 106 of the administrative manager computer 201 receives the log information and stores it into a database 104 (Step 503).

FIG. 7 shows log information 1301 given from each job executing computer 202 to the administrative manager computer and stored in the database 104.

Each line indicates log information corresponding to a single event. In each piece of log information, "Event Log Identifier" stands for an identifier of an event log generated, "Computer Name" for a name of a job executing computer 202 that gave the log information, "Time" for a time when the event was generated, "Event Log Class" for a class of the event generated, "Operational Definition Identifier" for "Operational Definition Identifier" specified in the definition of FIG. 4 when the generated event is an event of a job or a job net, and "Detailed Information" for contents of the event. "Event Log Class" includes at least a start or end of a job. When "Event Log Class" is a start of a job, "Time" of that log information indicates a time when execution of the job indicated by "Operational Definition Identifier" of that log information is started in a computer assigned to that job in the definition of FIG. 4, i.e., a job executing computer 202 indicated by "Computer Name". When "Event Log Class" is an end of a job, "Time" of that log information indicates a time when execution of the job indicated by "Operational Definition Identifier" of that log information is ended in a computer assigned to that job in the definition of FIG. 4, i.e., a job executing computer 202 indicated by "Computer Name".

Here, for the sake of simplicity of description, only log information collected with regard to the job net A out of the job nets defined in FIG. 4 is shown. However, log information is similarly collected with regard to the job net B, too.

In each job executing computer 202, the job definition information/log information collecting part 110 of the integrated management agent 113 sends the job definition information held by the job execution control part 115 to the administrative manager computer 201, converting it into a predetermined common format for example, following a similar procedure to one shown in FIG. 6, in accordance with an instruction from the administrative manager computer 201.

The job definition information collecting part 107 of the administrative manager computer receives the job definition information from the job executing computers 202, prepares the definitions of the job nets and the jobs shown in FIG. 4 from the received information, and stores them into the database 104.

In the case of the above-described second mode of executing jobs, in which the job execution control part 115 of the above-mentioned one specific job executing computer 202 holds all the definition information shown in FIG. 4, it is sufficient for the administrative manager computer 201 to collect the job definition information from this one specific job executing computer 202.

Figure 8:
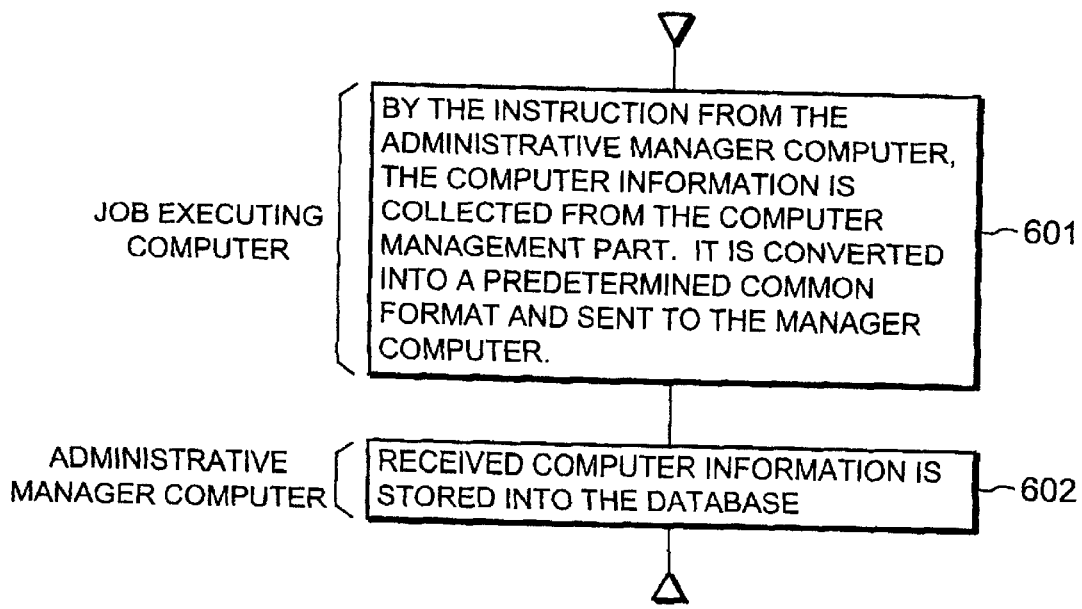
FIG. 8 is a flowchart showing a procedure for collecting computer information relating to the embodiment of the present invention.

Next, FIG. 8 shows a procedure for collecting computer information that indicates a CPU load, a memory utilization factor, or the like of each executable file executed in each job executing computer 202, from that each job executing computer 202 to the administrative manager computer 201. This procedure is performed when the administrative manager computer 201 gives an instruction to each job executing computer 202, periodically or at generation of a predetermined event.

By the instruction from the administrative manager computer 201, the computer information collecting part 111 of each job executing computer 202 requests the computer management part 116, which manages the resource of that job executing computer 202, to send the computer information. Receiving this request, the computer management part 116 delivers results of measurement of a CPU load, a memory utilization factor, or the like for each executable file executed on its own job executing computer 202 in a period of predetermined time from the present, as the computer information, to the computer information collecting part 111. The computer information collecting part 111 converts the received computer information to the predetermined common format, and sends it to the manager computer 201 (Step 601). The computer information collecting part 108 of the administrative manager computer 201 receives the computer information from each job executing computer 202, and stores it into the database 104 (Step 602).

Figure 9:
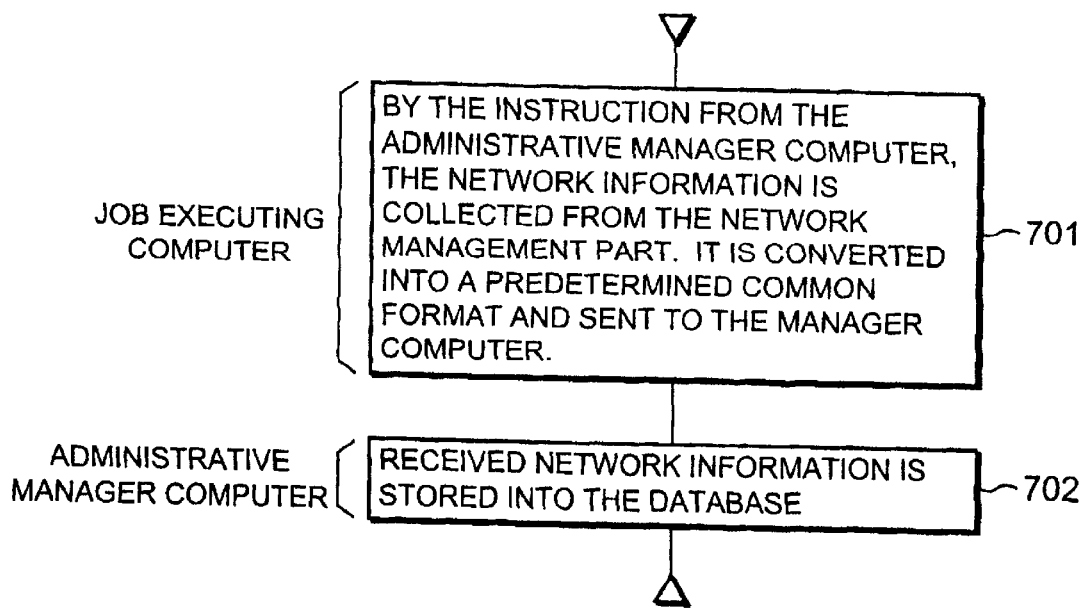
FIG. 9 is a flowchart showing a procedure for collecting network information relating to the embodiment of the present invention.

Next, FIG. 9 shows a procedure for collecting network information that indicates traffic of a logical channel on the network used by each executable file executed on each job executing computer 202, from that each job executing computer 202. This procedure is performed when the administrative manager computer 201 gives an instruction to each job executing computer 202, periodically or at generation of a predetermined event.

By the instruction from the administrative manager computer 201, the network information collecting part 112 of each job executing computer 202 requests the network management part 117, which manages a state of the network, to send network information. Receiving this request, the network management part 117 delivers, as the network information, results of measurement of traffic, a network utilization factor, and the like for each logical channel (specified by a combination of a communication port specifying an address of an executable file and communication port specifying an address of a communication partner of that executable file through the network) used by an executable file executed on its own job executing computer 202 in a period of predetermined time from the present, to the network information collecting part 112. The network information collecting part 112 converts the received network information to a predetermined common format, and sends it to the manager computer 201 (Step 701). The network information collecting part 109 of the administrative manager computer 201 receives the network information from the job executing computer 202, and stores it into the database 104 (Step 702).

Next, operation in the administrative manager computer 201 with respect to analyzing cause of delay in processing of a business processing (job net) will be described.

The performance information analysis part 103 of the administrative manager computer 201 analyzes cause of delay in certain business processing specified by the log information of FIG. 7 collected from each job executing computer 202 as described above and stored in the database 104 and by the definitions of the job nets and the jobs of FIG. 4 collected from each job executing computer 202 as described above and stored in the database 104.

Figure 10:
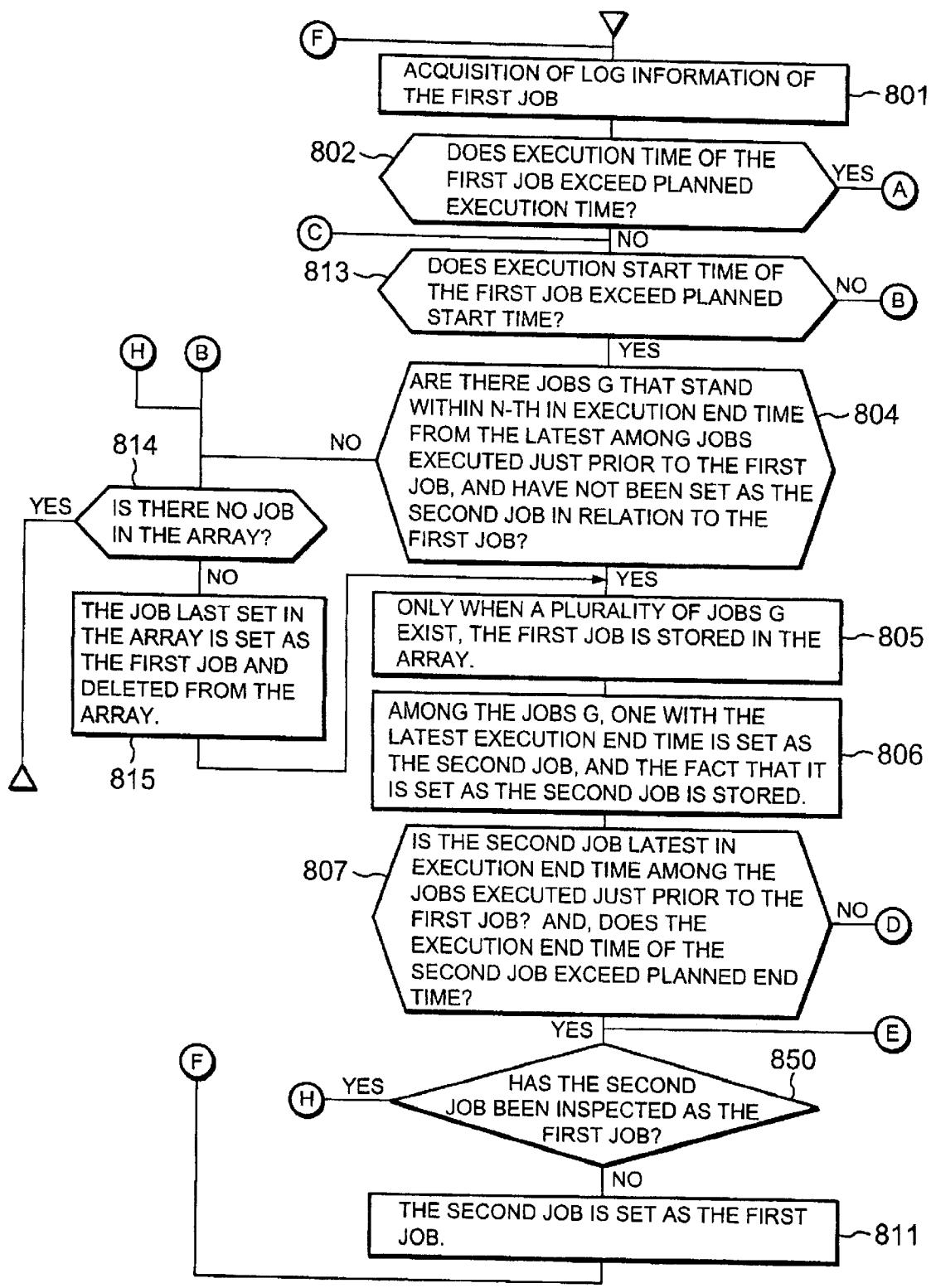
FIG. 10 is a flowchart showing a procedure for detecting a delay factor in execution of a job net relating to the embodiment of the present invention.
Figure 11:
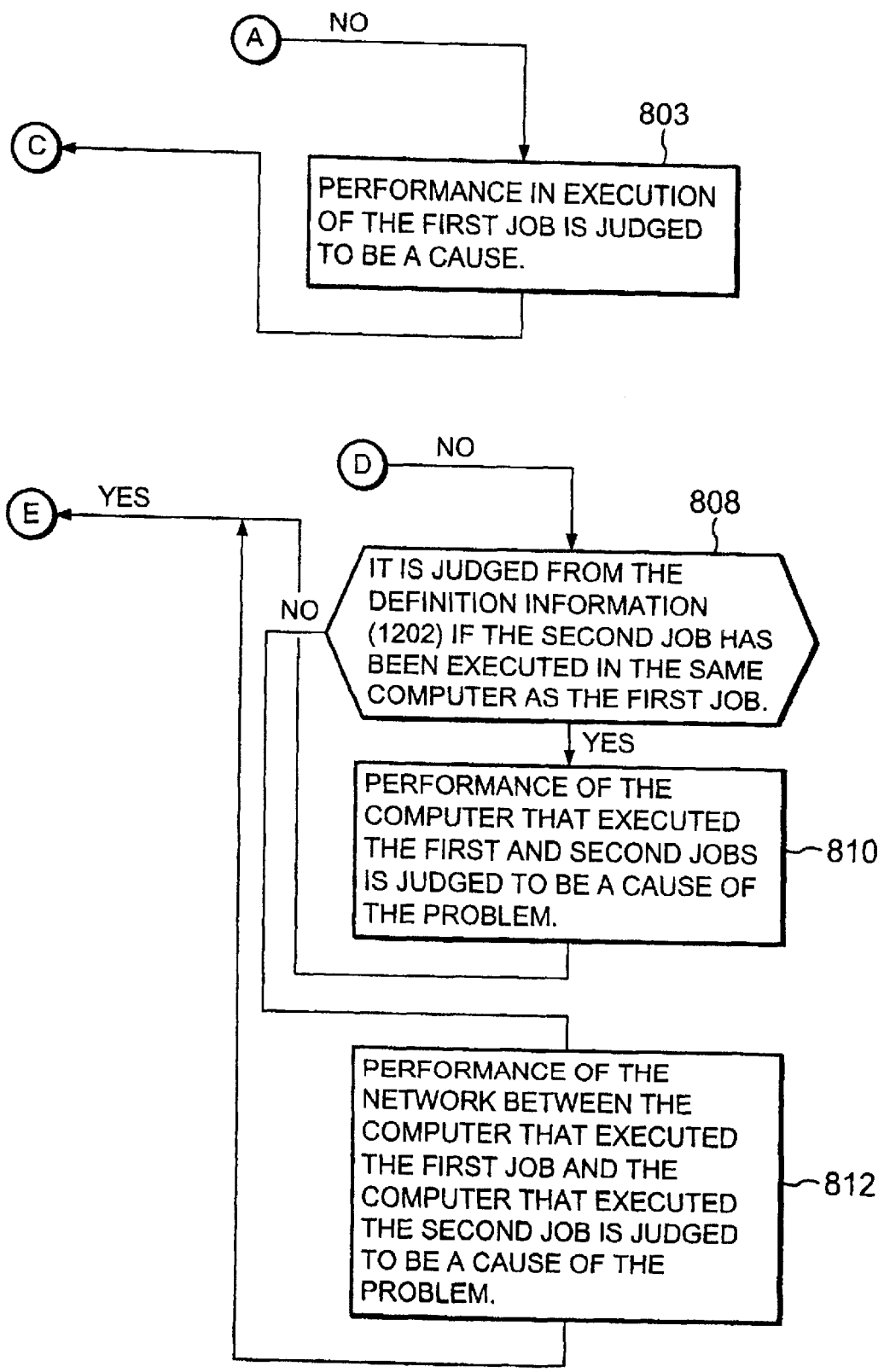
FIG. 11 is a flowchart showing a procedure for detecting a delay factor in execution of a job net relating to the embodiment of the present invention.

The performance information analysis part 103 monitors the log information of FIG. 7 stored in the database 104, and performs the procedures shown in FIGS. 10 and 11 when it detects an event, "a real end time of the job net is delayed from the planned end time for prescribed time or more", for example.

As a real end time of a job net, may be used an end time of the last job of that job net, shown in the log information given from the job executing computer 202 that executed the last job in question. Further, such structure may be employed that a job executing computer 202 that executed the last job of a job net informs the end time of that job net as log information, and the end time shown in this log information may be used as the real end time of the job net. Start time can be dealt with similarly.

As shown in FIG. 10, when the event "a real end time of the job net is delayed from the planned end time for prescribed time or more" is detected, the performance information analysis part 103 decides the last job of the job net in which the delay has been detected, from the definition of the job net in FIG. 4A, and sets that last job as a first job. Then, it stores the fact that the last job is set as the first job, into history information, and inspects this first job.

Namely, first, the log information of this first job as shown in FIG. 7 is obtained (Step 801), and judges if execution time, i.e., time between the start and end times of the execution exceeds planned execution time, i.e., time between the planned start time and the planned end time in the definition of the first job in FIG. 4B (Step 802).

When the execution time of the first job does not exceed the planned execution time, the procedure goes to Step 813. When the execution time exceeds the planned time, it is judged that a cause of the delay of the job lies in the execution delay in the first job in the job executing computer 202 executed the first job, and then the procedure goes to Step 803 in FIG. 11.

Next, in Step 813, the execution start time of this first job is obtained from the log information of FIG. 7, and it is judged if the execution start time of the first job is delayed from the planned start time in the definition of the job 1 in FIG. 4B.

When the execution start time of the first job is not delayed from the planned start time, it is judged that a cause of the delay in executing the job net does not lie in the flow up to the first job, and the procedure goes to Step 814. On the other hand, when the execution start time of the first job is delayed from the planned start time, the procedure goes to Step 804.

Next, in Step 804, from the definitions of the job nets in FIG. 4A and the history information, it is examined which are jobs G that stand within n-th in execution end time counting from the latest among jobs executed just prior to the first job, and are not set as a second job in relation to the first job.

Then, in Step 805, when there exist a plurality of jobs G, the first job is stored into an array "Branch Point", and the procedure goes to Step 806.

In Step 806, out of the jobs G, the latest one in its execution end time is selected, and set as the second job. The fact that this job is set as the second job in relation to the job set as the first job is stored into the history information.

On the other hand, if a job G does not exist, the procedure goes to Step 814.

In the case that the second job is set in Step 806, the execution end time of the second job is obtained from the log information of FIG. 7. In the case that the second job is the latest job in its execution end time among the jobs executed just prior to the first job, it is judged if the execution end time of the second job is delayed from its planned end time specified in the definition of the job in FIG. 4B (Step 807). When the execution end time of the second job is delayed from the planned end time, the procedure goes to Step 850.

On the other hand, when the execution end time of the second job is not delayed from the planned end time, it is judged if the second job was executed on the same job executing computer 202 as the first job, from the definitions of FIG. 4B (Step 808 in FIG. 11).

When the second job is the one executed on the same job executing computer 202 as the first job, it is judged that a cause of the delay in executing the job net lies in the performance of the job executing computer 202 that executed the first and second jobs (Step 810 in FIG. 11), and the procedure goes to Step 850. On the other hand, in the case that the second and first jobs were executed in different job executing computers 202, it is judged that a cause of the delay in executing the job net lies in the performance of the network between the job executing computer 202 that executed the first job and the job executing computer 202 that executed the second job (Step 812 in FIG. 11), and the procedure goes to Step 850.

In the process of FIG. 11, it is assumed that a cause of delay in starting the first job lies in transfer between the first job and the second job that is latest in its execution end time among the jobs executed just prior to the first job, the second job, and the corresponding computer or network is extracted. However, it is also possible that a cause of the delay in starting the first job lies in transfer between the first job and a job that is not latest in its execution end time among the jobs executed just prior to the first job. Thus, as the process of FIG. 11, may be employed the following. Namely, in a case where there is a job executed just prior to the first job and on the same job executing computer 202 as the first job, the performance of that job executing computer 202 is extracted as a cause of the delay. And, in a case where there is a job executed just prior to the first job and different from the first job in their job executing computers 202, the performance of the network between those job executing computers 202 is extracted as a cause of the delay. Namely, extracted is the performance of the network between the job executing computer 202 on which the first job is executed and the job executing computer 202 on which that job different from the first job in their job executing computers 202 is executed.

In Step 850, from the history information, it is investigated if the second job has been inspected as the first job, and when it is the inspected job, the procedure goes to Step 814. When it is not the inspected job, the second job is set as the first job (Step 811), and the fact that this job is set as the first job is stored into the history information, and the procedure returns to Step 801.

In Step 814, it is investigated if the array "Branch Point" stores a job, and when no job is stored, the process is ended. On the other hand, when the array "Branch Point" stores a job or jobs, a job that was stored last among the jobs stored in the array "Branch Point" is set as the first job, the procedure returns to Step 804, and the job that is set as the first job is deleted from the array "Branch Point".

Now, taking the job system shown in FIG. 5 as an example, application of the above-described process will be described, assuming n in Step 804 to be 2.

First, when delay is generated in the job net, the job 5 is set as the first job, and the job 5 is inspected for delay in its execution time, in Steps 801, 802, and 803.

(1-2)

When the execution start time of the job 5 is delayed from the planned start time (Step 813), the job 4, which is just prior to the job 5, is set as the job G. Here, only job 4 is classified as the job G, and thus, it is not stored into the array "Branch Point" in Step 805. Further, since only job 4 is classified as the job G, this job 4 is set as the second job in Step 806, and it is examined if there is delay from the end of the job 4 till the start of the job 5 in Steps 807, 808, 810, and 812.

(2-1)

Next, the job 4 as the second job is set as the first job (Step 811), and this job 4 is inspected for delay in its execution time, in Steps 801, 802, and 803.

(2-2)

When the execution start time of the job 4 is delayed from its planned start time (step 813), the job 3 and the job 2, which are just prior to the job 4, are set as the jobs G. Here, as the jobs G, are classified a plurality of jobs, the job 3 and the job 2, and accordingly, the job 4 as the first job is stored into the array "Branch Point". Next, assuming that, between the job 2 and job 3, both set as the jobs G, the job 2 is later in its execution end time, the job 2 is set as the second job in Step 806. It is stored that this job 2 is set as the second job in relation to the job 4 as the first job. Then, it is examined if there is delay from the end of the job 2 till the start of the job 4 in Steps 807, 808, 810, and 812.

(3-1)

Next, the job 2 as the second job is set as the first job (Step 811), and this job 2 is examined for delay in execution time, in Steps 801, 802 and 803.

(3-2)

When the execution start time of the job 2 is delayed from its planned time (Step 813), the job 1 is set as a job G. Here, only job 1 is set as the job G, and accordingly, storing into the array "Branch Point" is not performed in Step 805. Next, the job 1, only which has been set as the job G, is set as the second job in Step 806, and it is examined if there is delay from the end of the job 1 till the start of the job 2 in Steps 807, 808, 810, and 812.

(4-1)

Next, the job 1 as the second job is set as the first job (Step 811), and this job 1 is examined for delay in execution time, in Steps 801, 802, and 803.

(4-2)

Thus, when the execution start time of the job 1 is delayed from its planned start time (Step 813), jobs G are inspected. Here, since there is no job G, it is investigated if a job is stored in the array "Branch Point". Here, the job 4 is stored. This job 4 is the job stored last, and accordingly, this job 4 is set as the first job, and the job 4 is deleted from the array "Branch Point".

(5-1)

This job 4 is set as the first job, and it is investigated if there is a job G just prior to the job 4. Among the jobs just prior to the job 4, only job 3 is a job that has not been set as the second job in relation to the job 4 as the first job. Accordingly, here, storing into the array "Branch Point" is not performed in Step 805. Further, the job 3, only which is set as the job G, is set as the second job in Step 806. Here, since the job 3 is not the job that is latest in its execution end time among the jobs just prior to the first job, it is not examined if there is delay from the end of the job 3 till the start of the job 4 in Steps 807, 808, 810, and 812.

(6-1)

Then, the job 3 as the second job is set as the first job (Step 811), and this job 3 is examined for delay in execution time, in Steps 801, 802, and 803.

(6-2)

When the execution start time of the job 3 is delayed from the planned start time (Step 813), the job 1, which has not been set as the second job in relation to the job 3, is set as a job G. Here, only job 1 is set as the job G, storing into the array "Branch Point" is not performed in Step 805. Next, the job 1, only which has been set as the job G, is set as the second job in Step 806, and it is examined if there is delay from the end of the job 1 till the start of the job 3 in Steps 807, 808, 810, and 812.

(6-3)

Next, since the job 1 as the second job has already been set as the first job and examined (Step 850), it is investigated, in Step 814, if a job is stored in the array "Branch Point". Since no job is stored, all process is ended.

In the above description, if, for example, the execution start time of the job 4 is not delayed from its planned start time, then, after performing the above-described (1-2)–(2-1), it is investigated, in Step 814, if a job is stored in the array "Branch Point". Since no job is stored in this case, all process is ended.

Thus, according to the above-described process, from the viewpoint of the execution sequence of jobs, a part before a point at which no delay exists, i.e., at which an execution start time is not delayed from the planned start time is regarded as normal, and only the part to be performed after that point in the execution sequence of jobs is examined to extract a cause of the delay of the job net. Accordingly, it is possible to more efficiently analyze a cause of delay of a job net in comparison with a case in which the whole execution sequence of jobs is examined.

However, when it is desired to investigate a part before a point at which an execution start time is not delayed from the planned start time, it is sufficient to omit Step 813, performing Step 804 after Step 802.

Further, when, in the above description, n is 1 in Step 804 for example, then, in the above (2-2), only the job 2 having the latest execution end time is set as the job G. Accordingly, in Step 805, the job 4 as the first job is not stored into the array "Branch Point". Accordingly, after performing the above (1-1)–(4-1), it is detected in (4-2) that no job is stored in the array "Branch Point", and the process is ended. Thus, in this example, since delay of the execution start time of the job 4 depends in greater degree on the job having later execution end time between the job 3 and job 2, only the execution sequence leading to the job 4 via the job 2 is examined, without investigating the execution sequence leading to the job 4 via the job 3.

Thus, according to the above-described process, by selecting a value of n, it is possible to limit a range in which a cause of delay of a job net is investigated, only to a part of the execution sequence that has a large effect on the delay of the job net. Thus, it is possible to analyze a cause of delay of a job net more efficiently in comparison with the case in which all the execution sequence of jobs is investigated.

When it is not desired to limit the range in which a cause of delay of a job net is investigated only to a part of the execution sequence that has a large effect on the delay of the job net, the value of n may be set at more than the maximum of the number of jobs executed in parallel from the viewpoint of the execution sequence. Or, in Step 805, all the jobs that has not been set as the second job in relation to the first job among the jobs just prior to the first job may be set as the jobs G.

Further, in the above description, it is possible that, at the time when such a job appears that difference between its execution start time/execution end time expressed in the log information and its planned start time/planned end time expressed in the definition of that job exceeds a predetermined threshold, that job is set as the first job in place of the last job of the job net, and then, the process shown in FIGS. 10, 11 is performed.

Further, generally, a job is executed in each job executing computer 202 in the following manner. Namely, at the time when the above-described condition for executing the job (arrival of the planned start time or end of execution of a job just prior to the job in question) is satisfied, that job is put into a queue provided in each job executing computer 202. Thereafter, at the time when the job executing computer 202 can actually process a job stored in the queue, a job is taken out in turn from the queue and executed. Length of time from putting a job into the queue till taking out that job from the queue varies depending on resources and throughput of the job executing computer 202. Thus, the time when a job is in this queue may be taken into consideration as a delay time due to the queue, to analyze a cause of delay of a job net. In detail, for example, a time when a job is put into a queue is collected as log information from each job executing computer 202 to the administrative manager computer 201, and, between Step 801 and Step 802, is provided a procedure in which performance of a computer assigned to a job is judged to be a cause of delay of the job net when a length of time between an input time of the job into the queue and an execution start time of that job exceeds a predetermined threshold. Here, the execution start time of a job implies a time when that job is taken out from the queue and actually executed.

In the following, there is described a procedure for presenting a cause of delay in execution of a job net, which is judged from the process shown in FIGS. 10, 11 as described above.

First, the display part 190 of the administrative manager computer 201 displays a fault monitoring screen 901 shown in FIG. 12A. The fault monitoring screen 901 displays log information collected from job executing computers 202 up to that point of time in time series, with regard to a job net designated by an operator. Further, when there is delay in the job net, the display part 190 displays a fact that the delay has been detected on the fault monitoring screen 901.

When, on this fault monitoring screen 901, the operator selects a display part 902 displaying the fact that the delay has been detected, through the input part 180, and inputs an instruction to display detailed information, then, the display part 180 displays a detailed information display screen 903 on delay factors, shown in FIG. 12B.

As shown in FIG. 12B, the detailed information display screen 903 displays: a start time, indicating an execution start time; a computer, indicating a job executing computer 202 having executed the job in question; a cumulative delay time, indicating delay of an execution start time from the planned start time; delay time, indicating a time obtained by subtracting, from the cumulative delay time, the maximum cumulative delay time among cumulative delay times of jobs just prior to the job in question; and, a delay source indicating a delay factor judged in the process of FIGS. 10, 11, for each job constituting the job net in which execution delay has been detected.

Further, when an operator inputs selection of a delay source and an instruction to display a causal location via the input part 180, the display part 190 displays the causal location, as shown in FIGS. 13, 14.

Figure 13A:
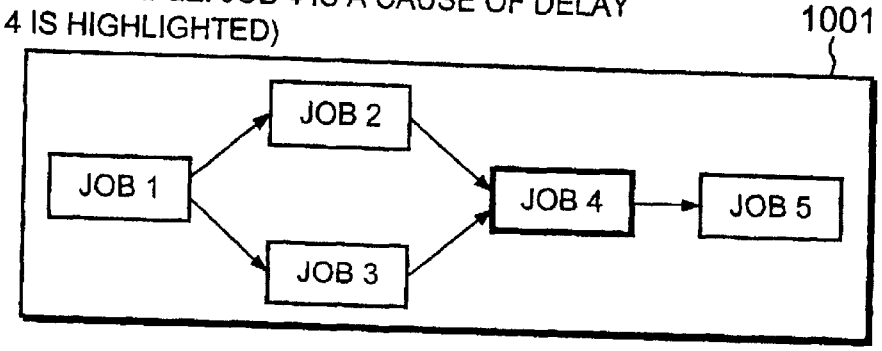
FIGS. 13A–13C show a display screen for displaying a delay factor in execution of a job net relating to the embodiment of the present invention.
Figure 13B:
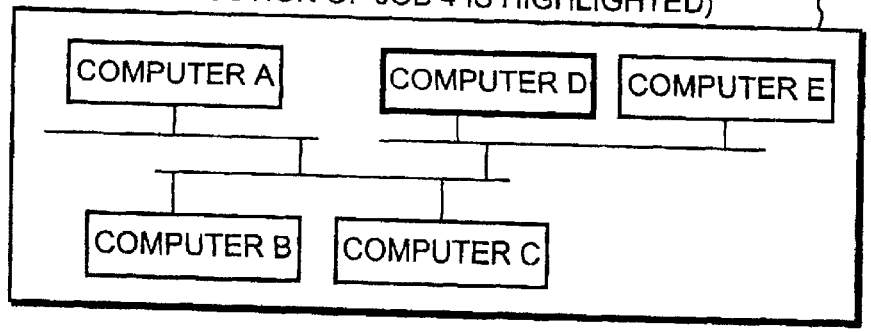
Figure 13C:
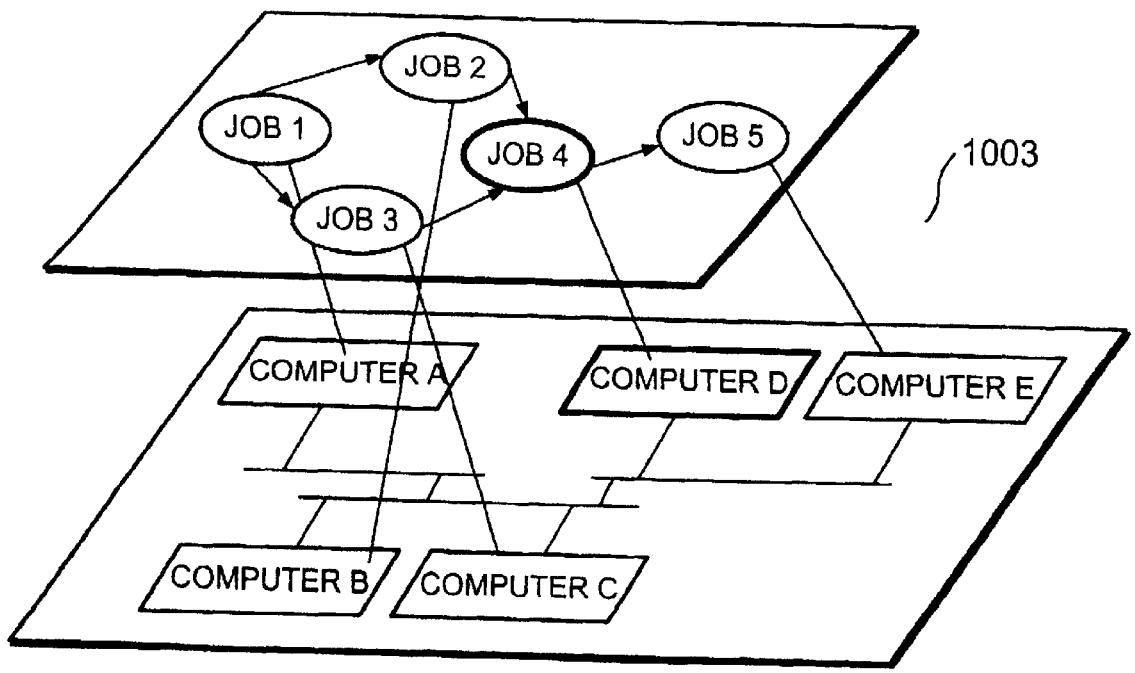

Display 1001 shown in FIG. 13A is given when the selected delay source is judged to come from performance of a computer in Step 803 of FIG. 11, highlighting a job whose execution time exceeded the planned time in Step 802 of FIG. 10, in a block diagram of the job net connecting the jobs with arrows in the sequence of executing the jobs. Further, display 1002 shown in FIG. 13B can be invoked by an operator on the display of FIG. 13A and highlights a job executing computer 202 that executes the job highlighted in FIG. 13A, in a network block diagram linking the job executing computers 202 in accordance with their connecting relation via the network. Display 1003 shown in FIG. 13C is a combination of the display 1001 of FIG. 13A and the display 1002 of FIG. 13B, displaying a relation between the job judged to contain the cause of the delay and the computer, in one screen.

Figure 14A:
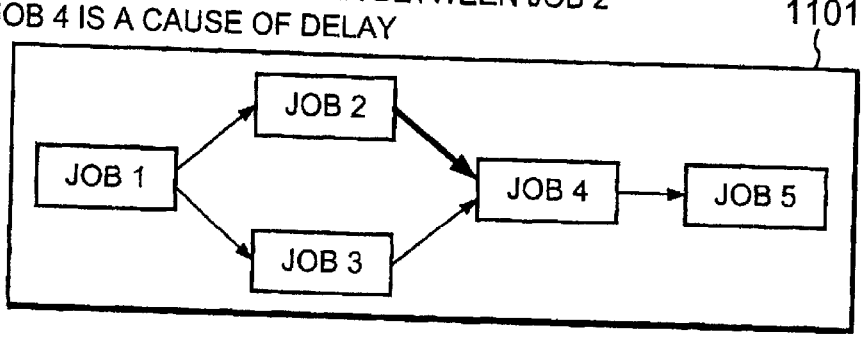
FIGS. 14A–14C show a display screen for displaying a delay factor in execution of a job net relating to the embodiment of the present invention.
Figure 14B:
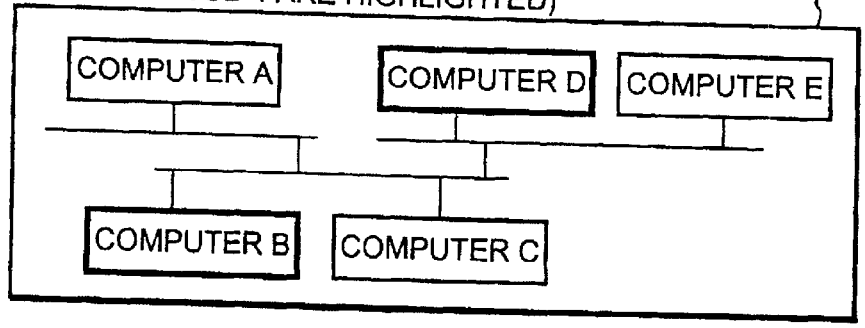
Figure 14C:
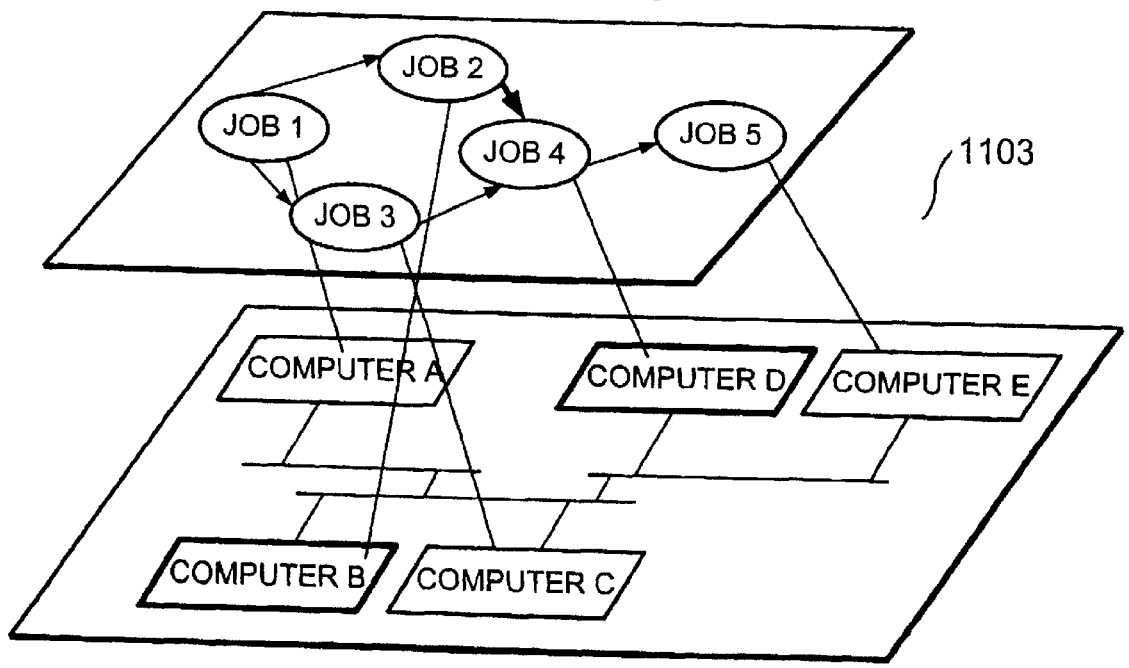

Further, display 1101 shown in FIG. 14A is given when the selected delay source is judged to come from performance of a computer or performance of a network between computers in Steps 810, 812 of FIG. 11, and highlights an arrow connecting the first job and the second job of the time when the execution time of the first job was judged to exceed the planned start time in Step 807 of FIG. 10, in a block diagram of the job net connecting the jobs. Further, display 1102 shown in FIG. 14B can be invoked by an operator on the display of FIG. 14A, and highlights one or two computers executed the two jobs highlighted in FIG. 14A, in a network block diagram. Display 1103 shown in FIG. 14C is a combination of the display 1101 of FIG. 14A and the display 1102 of the FIG. 14B, displaying a relation of the transfer between the jobs judged to contain the cause of the delay to the computers, in one screen.

According to thus-described displays, it is possible to present jobs, computers and networks which were delay factors, together with their relationship, in a graspable manner.

Next, with respect to a job that has been judged to be a cause of execution delay of a job net by the above-described process, there will be described procedures for analyzing a cause of delay in the job in further detail, from an aspect of resource usage of a job executing computer 202 that executes the job in question and from an aspect of traffic of a network used in execution of the job.

First, with respect to a job that has been judged to be a cause of execution delay of a job net, a procedure for analyzing a cause of delay in the job in further detail from the aspect of resource usage of a job executing computer 202 that executes the job in question will be described.

Here, it is assumed that, with respect to the job net A shown in the definition of FIG. 4, the process shown in FIGS. 10, 11 specified the job 2 and the job executing computer (B) 202-B that executes the job 2, as cause of delay in execution of the job net A.

From the aspect of the computer resources, two cases may be considered as a cause of delay in executing the job 2 in the job executing computer (B) 202-B: namely, a case where, from the viewpoint of the performance of the job executing computer (B) 202-B, its capability in executing the job 2 is deficient, and a case where throughput of the job executing computer (B) 202-B is deficient because a job or application other than the job 2 is executed in parallel with the job 2.

FIG. 15 shows a state in which the job net A and the job net B are executed in accordance with the definitions of FIG. 4 in the job system shown in FIG. 1.

Namely, with regard to the job net A, first, the job executing computer (A) 202-A executes the job 1 at 9:30 on Monday–Friday, in accordance with the definition of the job net in FIG. 4A and the definition of the job 1 in FIG. 4B. The job executing computer (B) 202-B awaits the end of the job 1 to execute the job 2, in accordance with the definition of the job net in FIG. 4A and the definition of the job 2 in FIG. 4B. Similarly, each of the job executing computers (C) 202-C–(E) 202-E executes an assigned job when the preceding job in the execution order ends, in accordance with the definition of the job net in FIG. 4A and a definition of the job assigned to itself in FIG. 4B.

On the other hand, with respect to the job net B, first, the job executing computer (B) 202-B executes the job 1 at 10:00 on Monday–Friday, in accordance with the definition of the job net in FIG. 4A and the definition of the job 1 in FIG. 4B. The job executing computer (E) 202-E awaits the end of the job 1 to execute the job 2, in accordance with the definition of the job net in FIG. 4A and the definition of the job 2 in FIG. 4B. Similarly, the job executing computer (C) 202-C executes the assigned job when the preceding job in the execution order ends, in accordance with the definition of the job net in FIG. 4A and the definition of the job assigned to itself in FIG. 4B.

As a result, as shown in FIG. 15, the job executing computer (B) 202-B executes the job 2 of the job net A and the job 2 of the job net B in parallel in the same time zone of Monday–Friday.

In such a case, even if the job executing computer (B) 202-B has sufficient capability for executing the job 2 of the job net A, it is possible that the job 1 of the job net B executed simultaneously in the job executing computer (B) 202-B puts pressure on the load of the job executing computer (B) 202-B to delay process of the job 2 of the job net A.

Accordingly, in the present embodiment, with regard to a job judged to be a cause of delay in execution of a job net, a cause of delay in that job can be analyzed in further detail from the aspect of the resource usage of a job executing computer 202 that executes the job in question.

Figure 16:
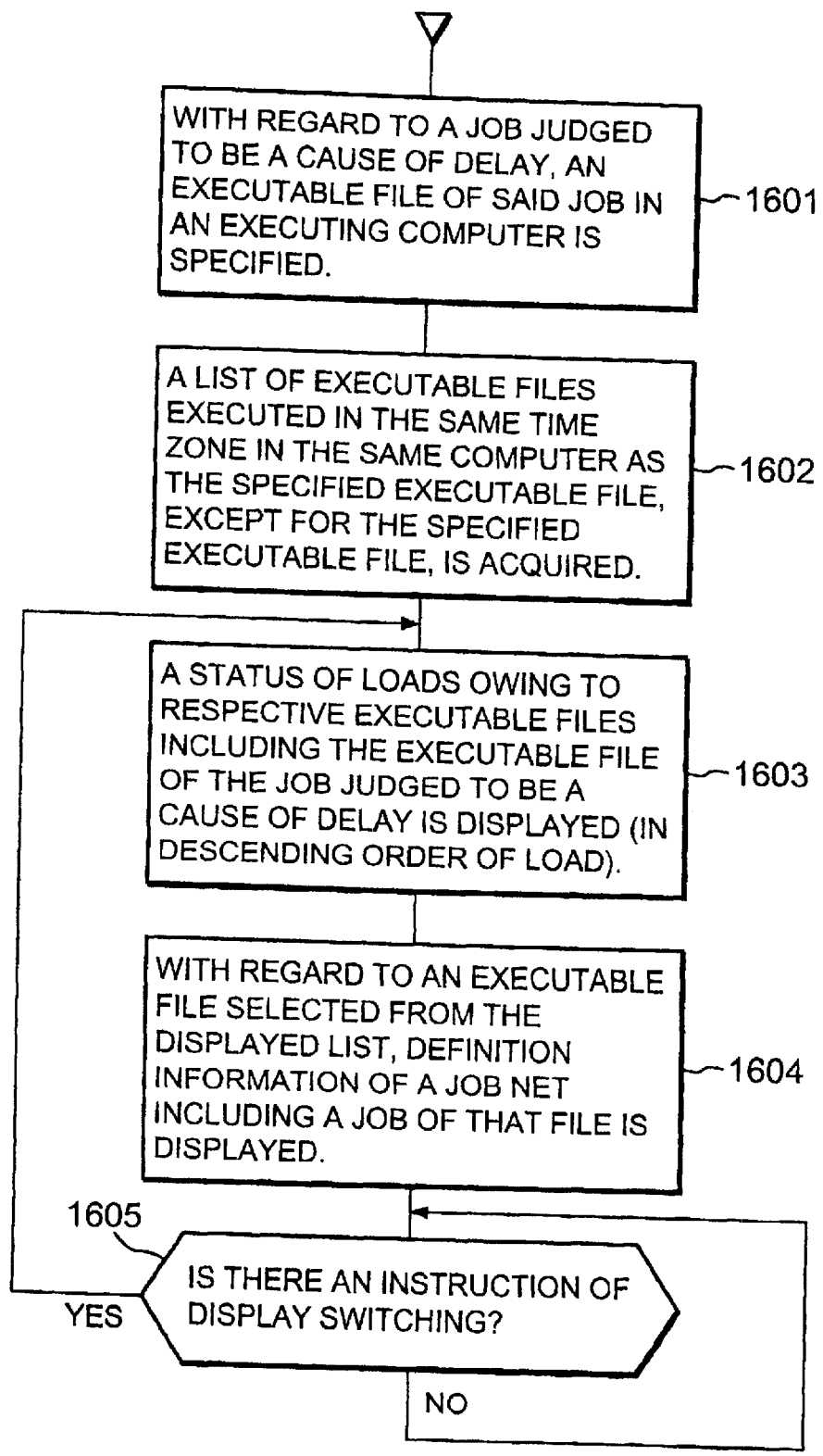
FIG. 16 is a flowchart relating to a job judged to be one cause of delay in execution of a job net, and showing a procedure for displaying a cause of delay in the job in question to an operator from an aspect of resource usage of a job executing computer 202 executing that job.

With respect to a job judged to be a cause of delay in execution of a job net, FIG. 16 shows a procedure for displaying a cause of delay in that job to an operator from the aspect of the resource usage of a job executing computer 202 that executes the job in question.

The performance information analysis part 103 of the administrative manager computer 201 displays a detailed information display screen as shown in FIG. 12B, when it specifies a cause of delay in execution of a certain job net defined in the definition information shown in FIG. 4. When an operator inputs selection of a delay source and an instruction to display a causal location on this detailed information display screen, via the input part 180, then, the display part 190 gives display of the causal location, as shown in FIGS. 13 and 14.

When, in the display screen shown in FIG. 13 (display screen given when a job executing computer is selected as the delay source in the detailed information display screen shown in FIG. 12B), an operator inputs via the input part 180 an instruction to analyze the delay source from the aspect of resource usage of a job executing computer, then, the flow of FIG. 16 is started.

First, the performance information analysis part 103 of the administrative manager computer 201 searches the computer information stored in the database 104 according to the above-described flow shown in FIG. 8, and specifies the computer information of the job executing computer 202 highlighted as the delay source in the display screen shown in FIG. 13. Then, among the computer information in question, it specifies the information indicating a CPU load or a memory utilization factor due to the executable file of the job to which the execution delay in that job executing computer 202 is attributed (Step 1601).

In a case where a plurality of jobs are executed on the job executing computer 202, it is possible that the executable file of the job to which the execution delay is attributed is also the executable file for other job. In such a case, the computer information includes pieces of information, each indicating a CPU load or a memory utilization factor due to the executable file having the same name as the executable file of the job to which the execution delay is attributed. Thus, in such a case, the information indicating the CPU load or the memory utilization factor due to the executable file of the job to which the execution delay is attributed is specified based on the execution start time and the execution end time of that job indicated by the log information collected with respect to that job to which the execution delay is attributed.

Next, among the computer information specified in the above-described manner, the performance information analysis part 103 of the administrative manager computer 201 specifies information indicating a CPU load or a memory utilization factor due to other executable files executed in the same time zone as the executable file of the job, to which the execution delay is attributed, by the job executing computer 202 that executed that job (Step 1602). That time zone is specified as described above. In that case, when it is possible to specify job nets and jobs of those job nets corresponding to those other executable files, by the execution start times and execution end times of those other executable files, specified from the names of those other executable files and from the information indicating the CPU loads or the memory utilization factors of those other executable files, based on the definition information shown in FIG. 4 or the log information shown in FIG. 7, then, the names of those job nets and those jobs are associated with those other executable files.

Next, the display part 190 of the administrative manager computer 201 displays a list indicating the information specified in the above Step 1601, which indicates the CPU load or the memory utilization factor due to the executable file of the job to which the execution delay is attributed, and the information specified in the above Step 1602, which indicates the CPU loads or the memory utilization factors due to those other executable files executed in the same time zone as the executable file of the job to which the execution delay is attributed (Step 1603).

Figure 17:
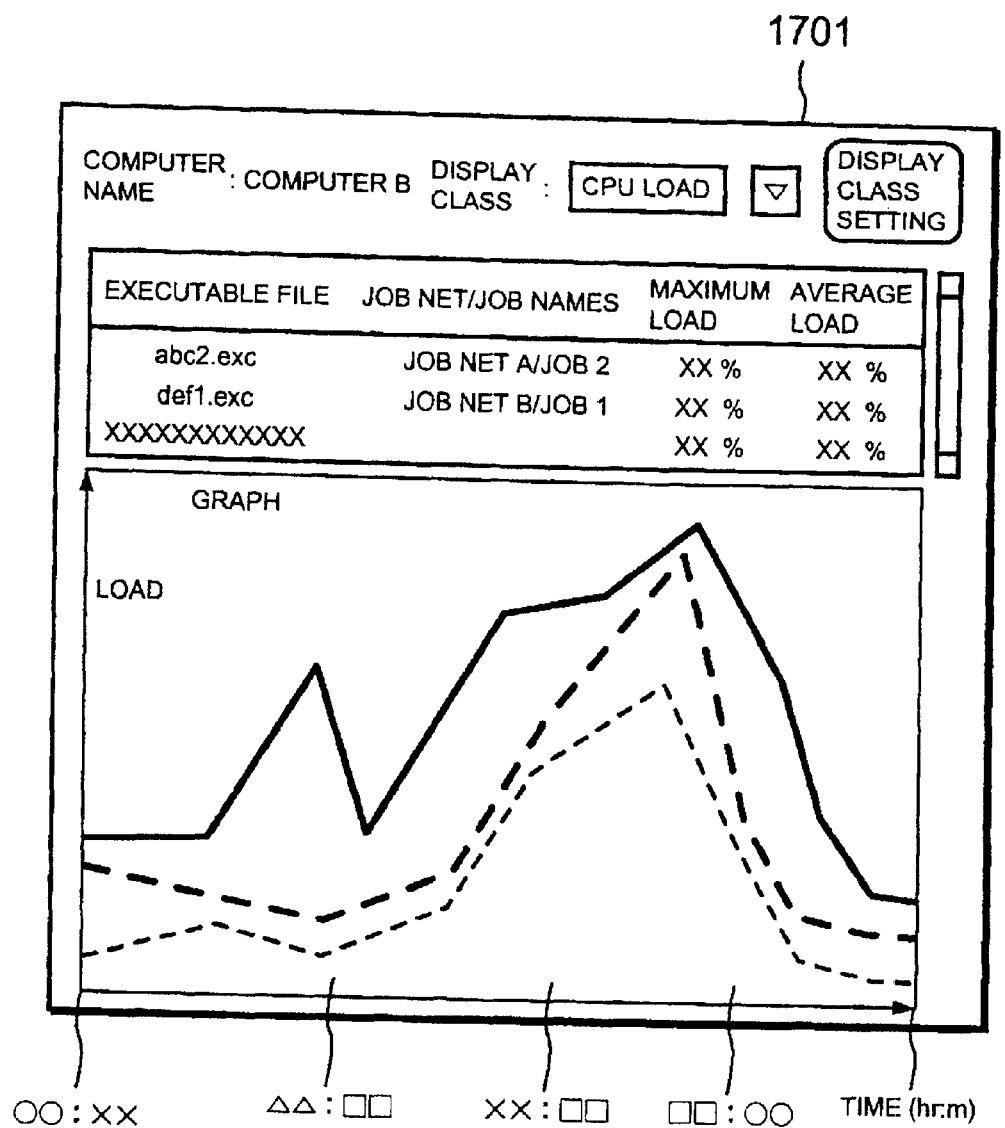
FIG. 17 shows the computer information displayed in the step 1603 of FIG. 16.

FIG. 17 shows the computer information displayed in Step 1603 of FIG. 16. In the figure, under "Computer Name", is shown the name of the job executing computer 202 highlighted in the display screen shown in FIG. 13 as the delay source. "Display Class" indicates if the displayed contents are CPU load or memory utilization factor. An operator can select a display class setting button 1701 via the input part 180, to set the display class to either CPU load or memory utilization factor. Under "Executable File Name" is shown a list of the names of the executable files specified in the above-described Steps 1601, 1602. Under "Job Net/Job Names", are shown names of job net/job, if there are such names corresponding to each executable file shown in the column of "Executable File Name".

Under "Maximum Load", are shown the maximum CPU loads due to the respective executable files shown in the column of "Executable File Name", and under "Average Load", the average CPU loads due to those respective executable files are shown. These columns "Maximum Load" and "Average Load" are changed to "Maximum Utilization Factor" and "Average Utilization Factor", when "Display Class" is set to the memory utilization factor. Under "Maximum Utilization Factor", are shown the maximum memory utilization factors due to respective executable files shown in the column of "Executable File Name", and under "Average Utilization Factor", the average memory utilization factors due to those respective executable files.

Further, under "Graph", is displayed a graph showing changes of a CPU load for each of the executable files specified in the above Steps 1601, 1602, with CPU loads being shown by the ordinate and times by the abscissa. When the "Display Class" is the memory utilization factor, changes of a memory utilization factor for each of the executable files specified in the above Steps 1601, 1602 are shown in a graph, with the ordinate showing memory utilization factors and the abscissa showing times.

It is preferable that the names of the executable files listed under "Executable File Name" are displayed being arranged in descending order of value shown under "Average Load" when "Display Class" is the CPU load, and in descending order of value shown under "Average Utilization Factor" when "Display Class" is the memory utilization factor.

Now, in the display screen shown in FIG. 17, when an operator selects a name of an executable file added with job net/job names, via the input part 180, then, the job net definition (see FIG. 4A) of the job net specified by those job net/job names and the definitions (see FIG. 4B) of respective jobs constituting that job net are displayed (Step 1604). Then, when the operator gives an instruction of display switching via the input part 180 (Step 1605), the procedure returns to Step 1603 and the computer information shown in FIG. 17 is displayed.

According to thus-described process, an operator can analyze a delay source of a job judged to be a cause of execution delay of a job net, in further detail, from the aspect of resource usage of a job executing computer 202 that executes the job in question. Further, by making it possible to display definition information of a job net including a job to which execution delay is attributed and definition information of a job net including other jobs executed by the same job executing computer 202 in the same time zone as the job in question, it is possible to assist an operator in reconsidering the job nets.

Next, there will be described a procedure for analyzing a delay source of a job judged to be a cause of execution delay of a job net, in further detail, from the aspect of traffic of a network used in executing that job. Here, the network used in executing a job implies a logical channel on a network between the job and an application, that network being set when a request of processing is made to the application running on a computer different from the job executing computer that executes the job in question.

Now, it is assumed that, with respect to the job net A shown in the definitions of FIG. 4, the process shown in FIGS. 10, 11 specified the job 2 and the job net executing computer (B) 202-B as delay factors in the execution of the job net A.

Here, from the aspect of the network resources, two cases may be considered as a cause of delay in executing the job 2 in the job executing computer (B) 202-B: namely, a case where a sufficient bandwidth can not be secured for a logical channel on the network used for performing the job 2, from the viewpoint of a communication band, and a case where a sufficient bandwidth can not be secured for a logical channel on the network used for performing the job 2, owing to pressure on all the bandwidth for logical channels used by applications sharing the network medium (for example, a case where jobs or applications different from the job 2 are executed simultaneously with the job 2 in the job executing computer (B) 202-B, and a sufficient bandwidth can not be secured for a logical channel on the network used for performing the job 2 owing to logical channels on the network used by those jobs or applications).

Figure 18:
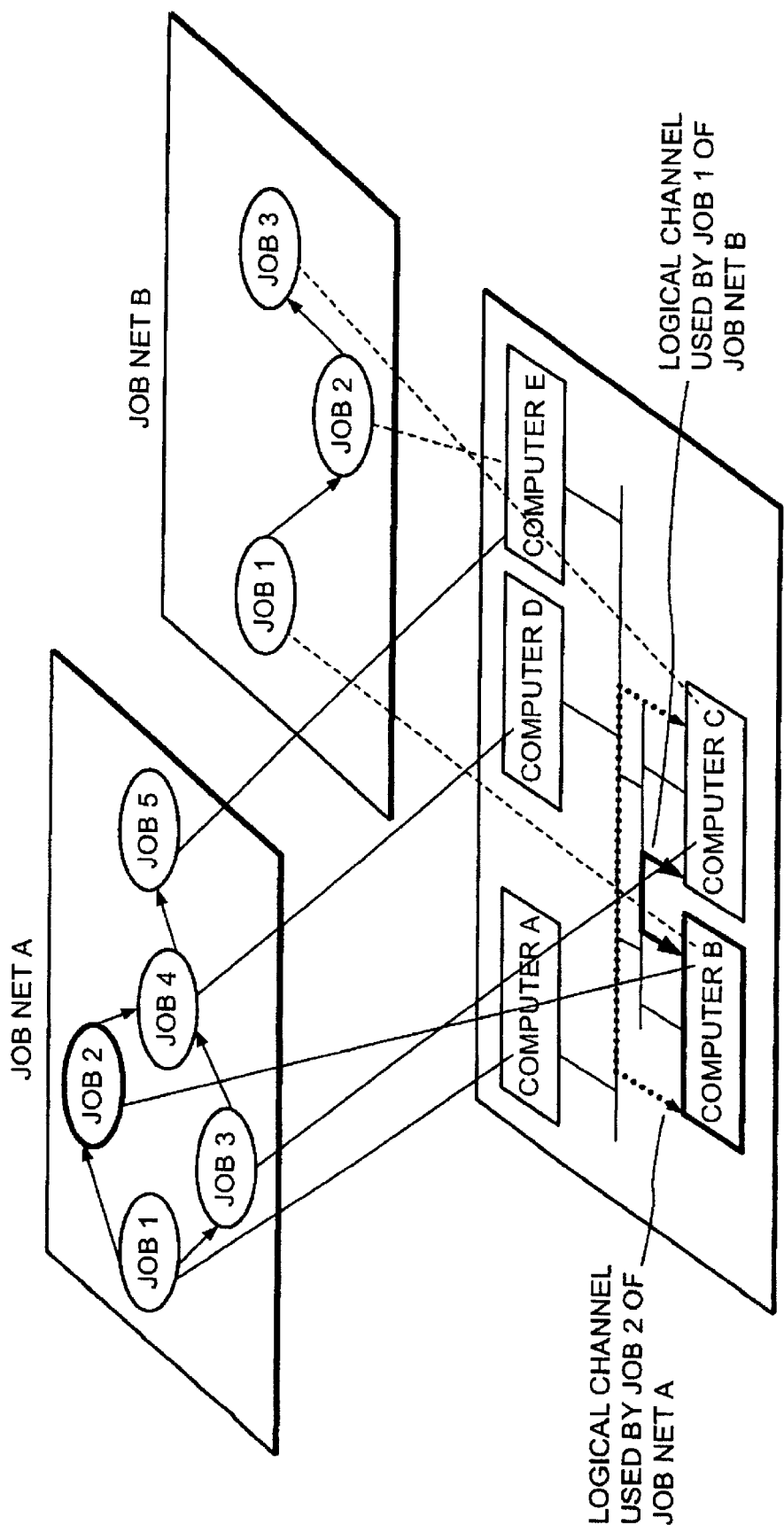
FIG. 18 shows a state in which, in the job system of FIG. 1, the job net A and the job net B are executed in accordance with the definitions of FIG. 4.

For example, even when, in FIG. 15, the job executing computer (B) 202-B has sufficient throughput for simultaneously executing the job 2 of the job net A and the job 1 of the job net B from the viewpoint of the performance, it is possible that, as shown in FIG. 18, a logical channel used by the job 1 of the job net B presses a bandwidth of a logical channel used by the job 2 of the job net A, to delay processing of the job 2 of the job net A.

Accordingly, in the present embodiment, it is possible to analyze a delay source of a job judged to be a cause of delay in executing a job net, in further detail, from the aspect of traffic of a network used in executing that job.

Figure 19:
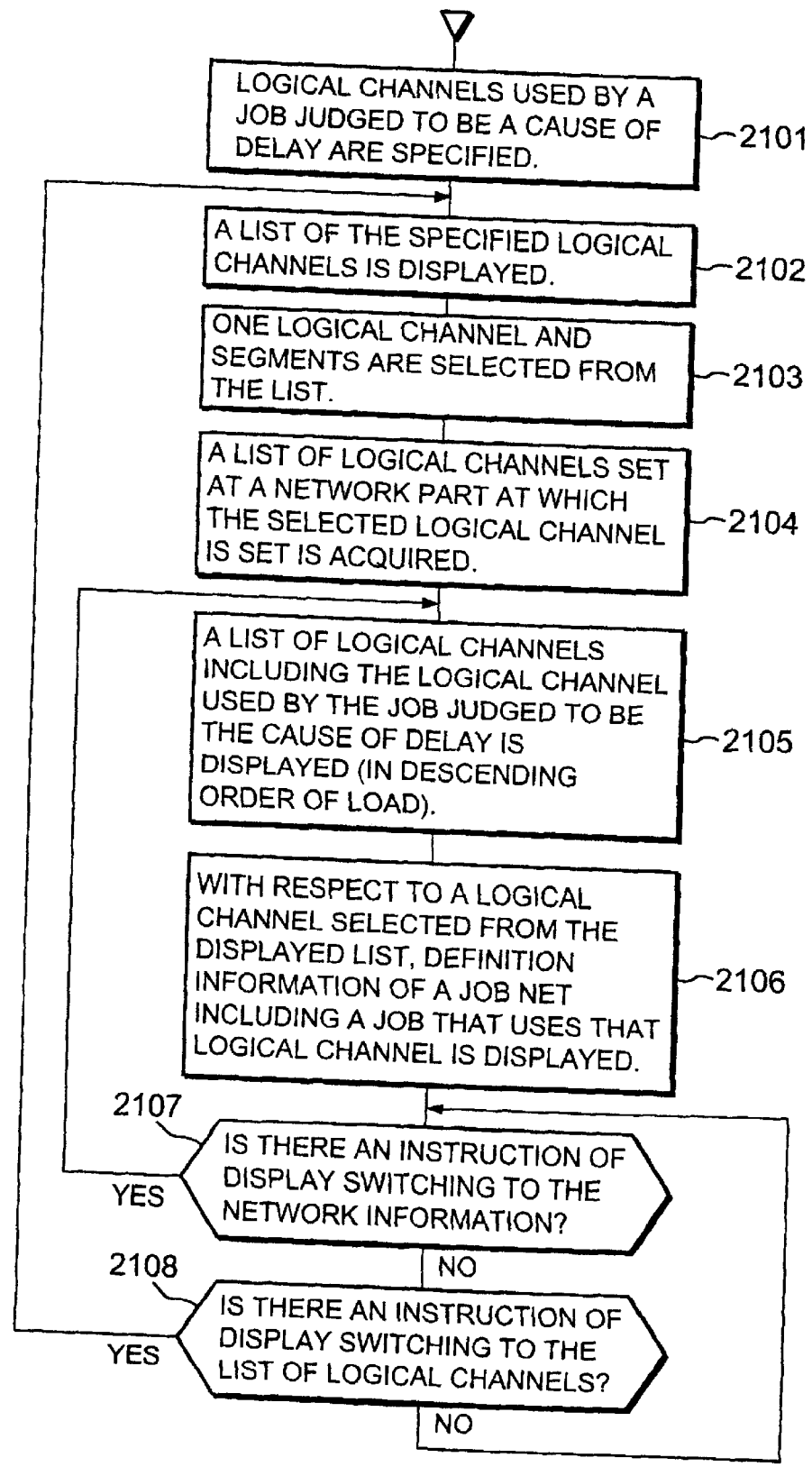
FIG. 19 is a flowchart relating to a job judged to be one cause of delay in execution of a job net and showing a procedure for displaying a cause of delay in the job in question to an operator from an aspect of traffic of a network used in executing that job.

FIG. 19 shows a procedure for displaying a delay source with respect to a job judged to be a cause of execution delay of a job net, from the aspect of traffic of a network used in executing that job.

When the performance information analysis part 103 of the administrative manager computer 201 specifies a cause of execution delay of a certain job net defined in the definition information shown in FIG. 4, by the above-described process of FIGS. 10, 11, then, it displays a detailed information display screen as shown in FIG. 12B. When an operator inputs selection of a delay source and an instruction to display a causal location on this detailed information display screen via the input part 180, then, the display part 190 gives display indicating the causal location as shown in FIGS. 13, 14.

When, in the display screen shown in FIG. 13 (display screen given when a job executing computer is selected as the delay source in the detailed information display screen shown in FIG. 12B), an operator inputs an instruction to analyze the delay source from the aspect of network traffic, then, the flow of FIG. 19 is started.

First, the performance information analysis part 103 of the administrative manager computer 201 searches the network information stored in the database 104 according to the above-described flow shown in FIG. 9, and specifies the traffic information of the logical channels used by the job highlighted as the delay source in the display screen shown in FIG. 13 (Step 2101). This can be performed by searching traffic information of a logical channel whose destination or source of communication is a port number associated with the job of the job net highlighted as the delay source in the display screen in FIG. 13, in the definitions shown in FIG. 4B concerning respective jobs constituting the job net in question, from the network information stored in the database 104. In that case, in addition to the logical channel set between the job highlighted as the delay source in the display screen shown in FIG. 13 and an application to which that job makes request for processing (either one of two communication ports terminating the logical channel corresponds to the communication port used by the above-mentioned highlighted job), a logical channel set between the application to which the processing is requested and an application to which the former application requested for the processing makes request for processing for performing the former processing (both two communication ports terminating the logical channel do not correspond to the communication port used by the above-mentioned highlighted job, but, one of the two corresponds to a communication port that forms a counterpart to the communication port used by the above-mentioned highlighted job) may also be included in the logical channel used by the above-mentioned highlighted job.

Next, the display part 190 displays a list of thus-specified logical channels used by the job highlighted in the display screen shown in FIG. 13 and segments used by the logical channels as the delay source (Step 2102).

FIG. 20 shows the list of logical channels displayed in Step 2102 of FIG. 19. In this figure, under "Job Net/Job Names", are shown the name of the job which was highlighted as the delay source in the display screen shown in FIG. 13 and the name of the job nets including that job. Under "Logical Channel Name", are shown combinations of each two communication port numbers terminating a logical channel. Under "Source Destination", are shown combinations of each two names of computers indicating a part (a communication medium (communication line or LAN) between two computers) of the network, to which is set a logical channel specified by two communication port numbers displayed under "Logical Channel Name". Further, under "Network Name", are shown names of lines or segments of LAN, each line or segment connecting two computers specified under "Source—Destination". The administrative manager computer 201 stores a table describing correspondence of a communication port number with a job executing computer 202 and jobs to which that communication port number is assigned, into the database 104. The performance information analysis part 103 of the administrative manager computer 201 can use this table to specify to which part of the network, and to which part of a running process associated with a job, each logical channel corresponds.

Next, when an operator selects any one logical channel (or, source—destination, or network name) in the display screen shown in FIG. 20 via the input part 180, the performance information analysis part 103 of the administrative manager computer 201 obtains information indicating traffic of the selected logical channel (or, logical channel corresponding to the selected source—destination or network name) in a period of executing the job highlighted as the delay source in the display screen shown in FIG. 13, from the network information stored in the database 104 (Step 2103). Further, the performance information analysis part 103 searches the network information stored in the database 104, to investigate if other logical channels are set at the network part (communication medium between two computers) at which the selected logical channel is set. In the case that other logical channels are set, it obtains information indicating traffic of those other logical channels in the period of executing the job highlighted in the display screen shown in FIG. 13 as the delay source (Step 2104). As described above, the administrative manager computer 201 stores the table describing correspondence of a communication port number with a job executing computer 202 and jobs to which that communication port number is assigned, into the database 104. Accordingly, the performance information analysis part 103 of the administrative manager computer 201 uses this table to specify to which part of the network, each logical channel corresponds to. In that case, when, with respect to each of the obtained other logical channels, either of two communication port numbers specifying the logical channel in question is set as one used by a job in the definitions shown in FIG. 4, the performance information analysis part 103 of the administrative manager computer 201 associates the name of that job and the name of the job net including that job with the logical channel in question.

Next, the display part 190 of the administrative manager computer 201 displays, in a list, the information indicating the traffic of the logical channel selected in the above Step 2103 and the information obtained in the above Step 2104, which indicates the traffic of the other logical channels set at the network part at which the logical channel selected in the above Step 2103 is set (Step 2105).

Figure 21:
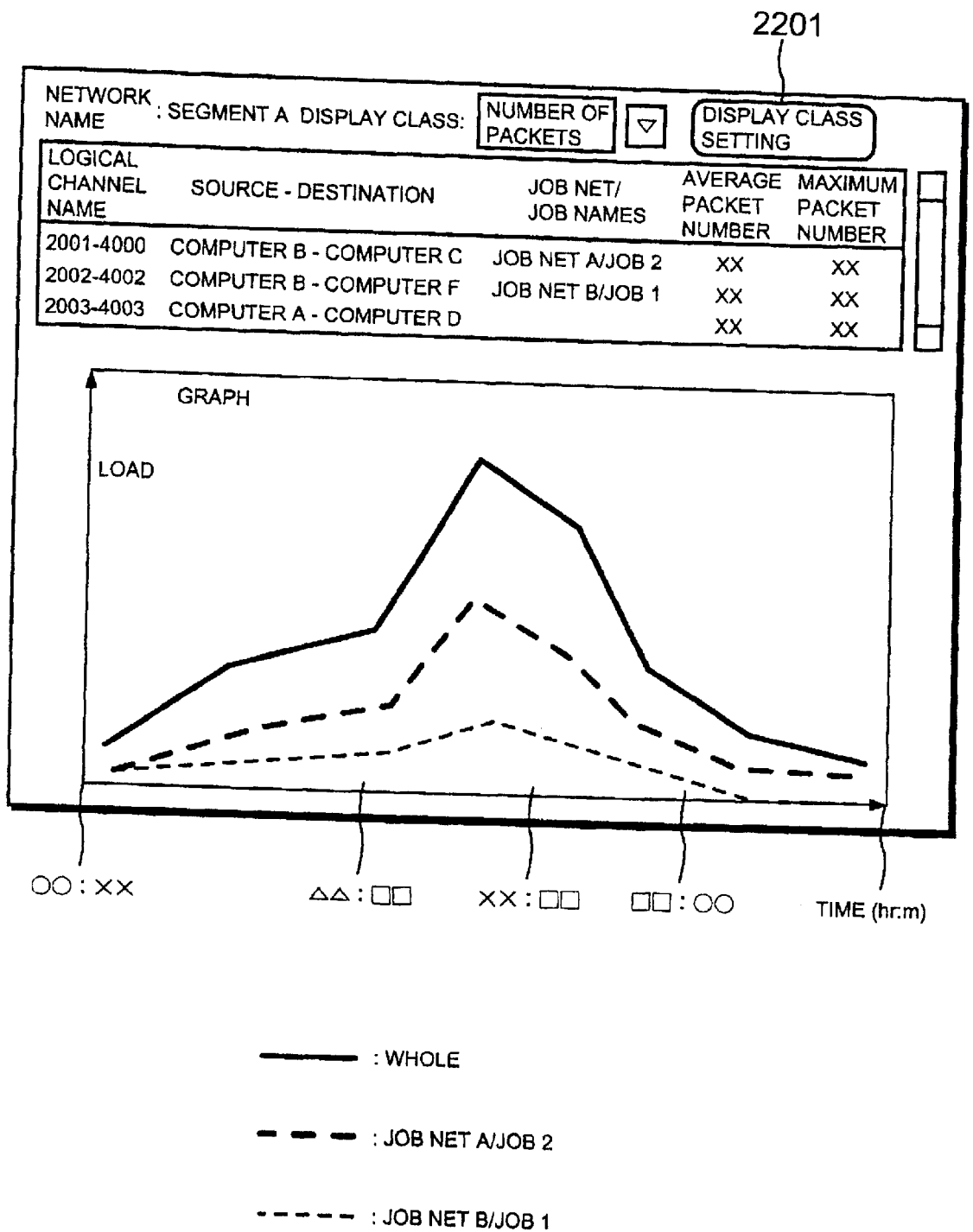
FIG. 21 shows the network information displayed in the step 2105 of FIG. 19.

FIG. 21 shows the network information displayed in Step 2105 of FIG. 19. In the figure, "Network Name" shows a name specifying a network part at which the logical channel selected in the display screen shown in FIG. 20 is set. "Display Class" indicates if the displayed contents are the number of packets or the number of bytes per unit time. An operator can select a display class setting button 2201 via the input part 180, to set the display class to either the number of packets per unit time or the number of bytes per unit time. Under the "Logical Channel Name", are shown, in a list, names of the logical channel selected in the above Step 2103 and of the other logical channels specified in the above Step 2104. Under "Job Net/Job Names", are shown names of job net/job, if there are such names corresponding to each logical channel displayed in the column of "Logical Channel Name".

Under "Average Packet Number", are shown the average numbers of packets per unit time in the respective corresponding logical channels shown in the column of "Logical Channel Name", and under "Maximum Packet Number", the maximum numbers of packets per unit time in those respective logical channels. These columns "Average Packet Number" and "Maximum Packet Number" are changed to "Average Byte Number" and "Maximum Byte Number" when "Display Class" is the number of bytes per unit time. Under "Average Byte Number", are shown the average numbers of bytes per unit time in the respective corresponding logical channels shown in the column of "Logical Channel Name", and under "Maximum Byte Number", are shown the maximum numbers of bytes per unit time in those respective logical channels.

Further, under "Graph", is displayed a graph showing changes of the number of packets per unit time in the logical channel selected in the above Step 2103 and in the other logical channels specified in the above Step 2104, with numbers of packets per each time unit shown by the ordinate and times by the abscissa. When the "Display Class" is the number of bytes per unit time, changes of the number of bytes per unit time in the logical channel selected in the above Step 2103 and in the other logical channels specified in the above Step 2104 are shown in a graph, with the ordinate showing numbers of bytes per unit time and the abscissa showing times.

It is preferable that the names of the logical channels listed under "Logical Channel Name" are displayed being arranged in descending order of value shown under "Average Packet Number" when "Display Class" is the number of packets, and in descending order of value shown under "Average Byte Number" when "Display Class" is the number of bytes.

Now, in the display screen shown in FIG. 21, when an operator selects a name of a logical channel added with job net/job names, via the input part 180, then, the job net definition (see FIG. 4A) of the job net specified by those job net/job names and definitions (see FIG. 4B) of respective jobs constituting that job net are displayed (Step 2106). Then, when the operator gives an instruction of display switching to the display screen of the network information via the input part 180 (Step 2107), the procedure returns to Step 2105 and the network information shown in FIG. 21 is displayed. Further, when an instruction of display switching to the display screen of the list of the logical channels is given (Step 2108), the procedure returns to Step 2102 and the list of the logical channels shown in FIG. 20 is displayed.

According to thus-described process, an operator can analyze a delay source of a job judged to be a cause of execution delay of a job net, in further detail, from the aspect of traffic of a network used in executing that job. Further, by making it possible to display definition information of a job net including a job to which execution delay is attributed and definition information of job nets including other jobs using the same network part in the same time zone as the job in question, it is possible to assist an operator in reconsidering the job nets.

In the flow shown in FIG. 19, when the job highlighted as the delay source is selected in the display screen shown in FIG. 13, the logical channels used by that job, the source—destination of those logical channels, and the names of the network parts at which those logical channels are set are displayed in a list as shown in FIG. 20. When one logical channel is selected in this list display screen, the network information as shown in FIG. 21 is displayed with respect to the network part at which the selected logical channel is set. However, it is possible that, when the job highlighted as the delay source in the display screen shown in FIG. 13 is selected, the network information as shown in FIG. 21 is directly displayed with respect to network parts at which logical channels used by that job are set respectively. For that purpose, the following design, for example, will be sufficient. Namely, when an operator uses a cursor to point to the column of the network name shown in FIG. 21, there is displayed a list of the network names indicating the network parts at which the logical channels used by the job selected in the display screen shown in FIG. 13 are set, respectively. Then, the operator designates a network name in the list using the cursor, so that the network information relating to that network name is displayed.

Next, a procedure will be described for relieving a load of a job executing computer 202 that executes a job judged to be a cause of execution delay of a job net.

Figure 22:
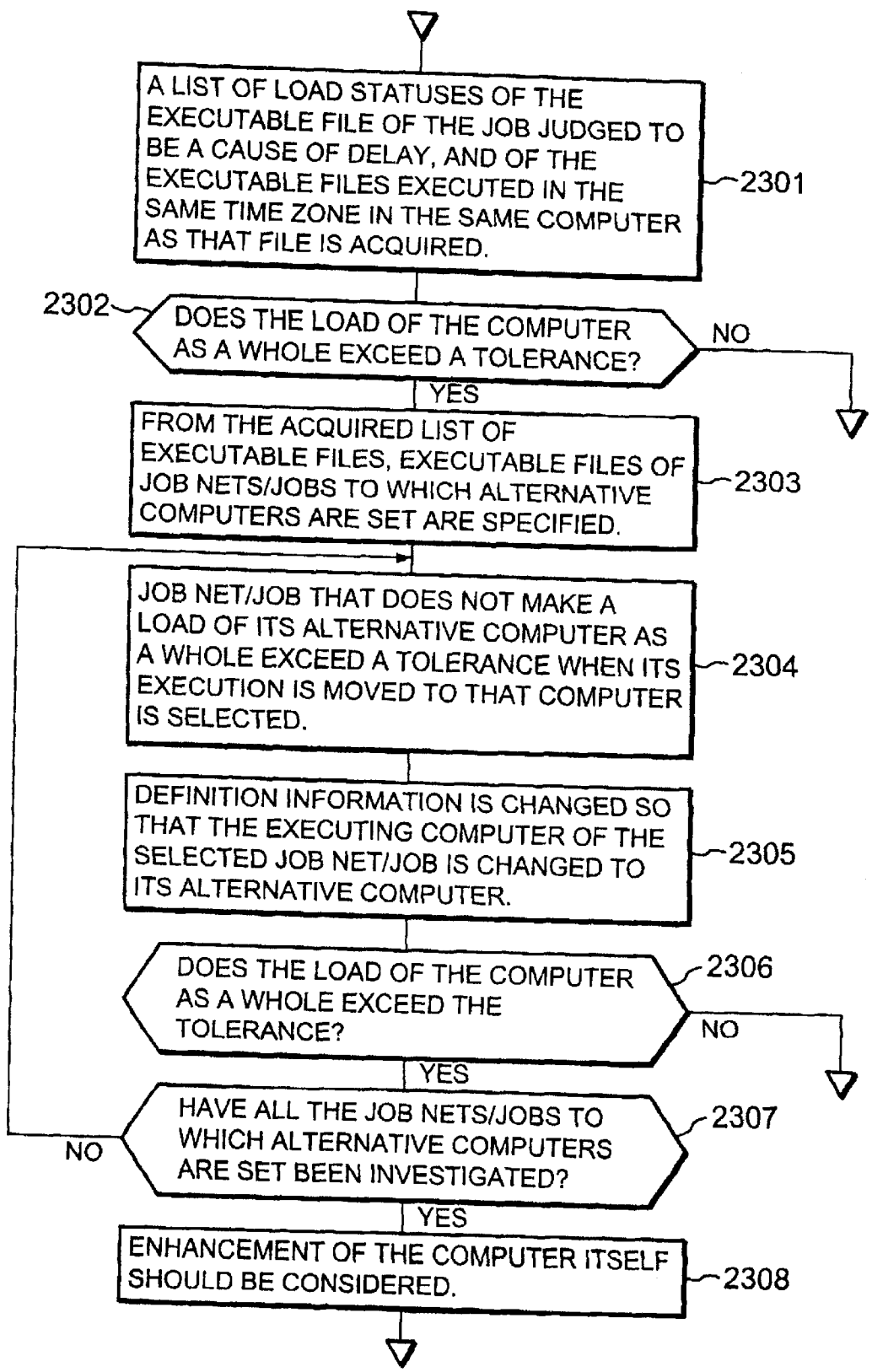
FIG. 22 is a flowchart relating to a job judged to be one cause of delay in execution of a job net and showing a procedure for reducing a load of a job executing computer 202 executing that job.

FIG. 22 shows a procedure for relieving a load of a job executing computer 202 that executes a job judged to be a cause of execution delay of a job net.

When the performance analysis part 103 of the administrative manager computer 201 specifies a cause of execution delay of a certain job net defined in the definition information shown in FIG. 4 by the above-described process of FIGS. 10, 11, it displays a detailed information display screen as shown in FIG. 12B. When an operator selects a job judged to be a cause of the execution delay of the job net and a job executing computer that executes the job in question and inputs a instruction to relieve the load of the computer, the flow of FIG. 22 is started.

First, the performance analysis part 103 of the administrative manager computer 201 searches the computer information stored in the database 104 according to the above-described flow shown in FIG. 8, and specifies the computer information of the job executing computer 202 that executes the job judged to be a cause of the execution delay of the job net. Then, among the computer information in question, it obtains the information indicating a CPU load or a memory utilization factor due to the executable file of the job judged to be a cause of the execution delay of the job net and the information indicating CPU loads or memory utilization factors due to the other executable files executed in the same time zone as the executable file of the job in question by the job executing computer 202 that executed the job in question (Step 2301). In that case, when it is possible to specify job nets and jobs of those job nets corresponding to those other executable files, by the execution start times and execution end times of those other executable files specified from the names of those other executable files and from the information indicating the CPU loads or the memory utilization factors of those other executable files, based on the definition information shown in FIG. 4 or the log information shown in FIG. 7, the names of those job nets and those jobs are associated with those other executable files.

Next, the performance analysis part 103 of the administrative manager computer 201 investigates if the CPU load or memory utilization factor of the job executing computer as a whole exceeds a predetermined tolerance or not, from the information obtained in the above Step 2301, which indicates the CPU loads or memory utilization factors due to respective executable files (Step 2302).

In the case of the excess, it is investigated if an alternative computer is set to the job judged to be a cause of the execution delay of the job net, by referring to the definition information shown in FIG. 4. Further, with respect to the executable files with which the names of the job nets and jobs are associated in Step 2301, it is investigated if alternative computers are set to the jobs of the job nets specified by those names of the job nets and jobs, respectively (Step 2303).

Next, among the jobs of the job nets, judged to have alternative computers set to them is Step 2303, there is selected a job of a job net such that, when that job is executed in an alternative computer, a CPU load or memory utilization factor of that alternative computer as a whole does not exceed a predetermined tolerance (Step 2304). In order to judge if the predetermined tolerance is exceeded, the computer information stored in the database 104 is searched to specify the computer information of the alternative computer. Among that computer information, is obtained the information indicating CPU loads or memory utilization factors due to executable files executed in that alternative computer in the same time zone as the executable file judged to be a cause of the execution delay of the above-mentioned job net. Then, the CPU load or memory utilization factor of the alternative computer as a whole, specified from the obtained information, is added to the CPU loads or memory utilization factors due to the executable files of the jobs of the job nets, judged to have that alternative computer set to them, obtained in the above Step 2301. Then, the value obtained by this addition is compared with the above-mentioned predetermined tolerance.

Next, the performance information analysis part 103 of the administrative manager computer 201 changes the definition information of FIG. 4 so that the job of the job net selected in the above Step 2304 is executed by the alternative computer of that job (Step 2305). In the case that (1) the above-described first mode is employed for execution control of a job net by the job execution control part 115 of each job executing computer 202, i.e., in the case that the job execution control part 115 of each job executing computer 202 holds, as its job definition information, a part of the definition information relating to the jobs assigned to its own job executing computer 202 out of the definition information shown in FIG. 4, to control execution of the jobs assigned to its own job executing computer 202, the performance information analysis part 103 of the administrative manager computer 201 sends the definition information of the job of the job net selected in the above Step 2304 (the definition information in which the name of its computer is changed to one displayed as the alternative computer) to the alternative computer, and, at the same time, instructs the computer that has executed the job of the job net selected in the above Step 2304 to discard the definition information on that job of the job net. On the other hand, in the case that (2) the above-described second mode is employed, i.e., in the case that the job execution control part 115 of one specific job executing computer 202 out of the job executing computers 202 controls execution of the job net, the performance information analysis part 103 of the administrative computer 201 sends the amended definition information shown in FIG. 4 (the definition information in which the computer name of the job of the job net selected in the above Step 2304 is changed to one displayed as the alternative computer).

Next, the performance analysis part 103 of the administrative manager computer 201 subtracts the CPU load or memory utilization factor due to the executable file of the job of the job net whose execution is transferred to the alternative computer in the above Step 2305 from the CPU load or memory utilization factor of the job executing computer as a whole obtained in the above Step 2302, and investigates if the obtained value exceeds the above-mentioned predetermined tolerance or not (Step 2306).

If there is no excess, this flow is ended. On the other hand, if there is the excess, and when all the jobs of the job nets judged to have respective alternative computers set to them have not been investigated, the procedure returns to Step 2304. When all the jobs have been investigated, it prompts an operator to enhance the performance of the job executing computer that executes the job judged to be a cause of the execution delay of the job net, via the display part 190 (Step 2307).

Hereinabove, one embodiment of the present invention has been described.

In the above embodiment, in a case where each of the plurality of job nets defined by the definition information shown in FIG. 4 has been analyzed in execution delay of that job net according to the process of FIGS. 10, 11, the administrative manager computer 201 may make the display part 190 display a screen, in which, out of these plurality of job nets, a job net generating delay and a location of that delay can be specified, according to an operator's instruction inputted into the input part 180.

Figure 23:
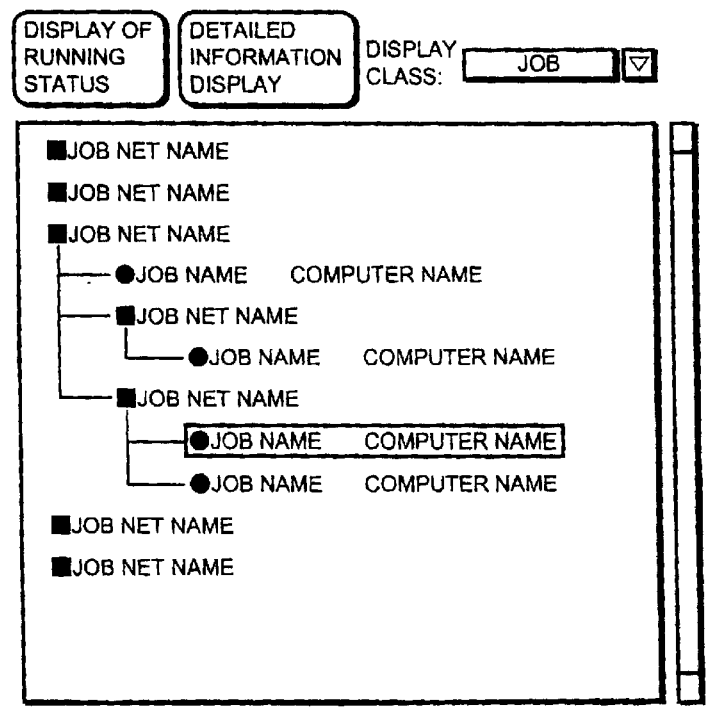
FIG. 23 shows an example of a screen for selecting a job of a job net judged to be one cause of delay out of a list of job nets and jobs constituting each of the job nets, the listed job nets being executed in the job system shown in FIG. 1.

FIG. 23 shows an example of a screen for selecting a job of a job net, judged to be a cause of delay, out of a list of the job nets and the jobs constituting each of these jobs, executed in the job system shown in FIG. 1. In this screen, jobs of job nets judged to be a cause of delay by the process shown in FIGS. 10, 11 are highlighted, for example, by changing their color. When a highlighted job of a job net is selected on this screen, is started the procedure shown in FIG. 16 for displaying, to an operator, a delay source of that job of the job net in question from the aspect of resource usage of the job executing computer that executes the job in question, or the procedure shown in FIG. 19 for displaying the delay source to an operator, from the aspect of traffic of a network used in executing that job. By using the display screen shown in FIG. 23, it is easy to select a job to be examined on a cause of a bottleneck out of a plurality of highlighted jobs, when a plurality of job nets are evaluated on a job system.

Figure 24:
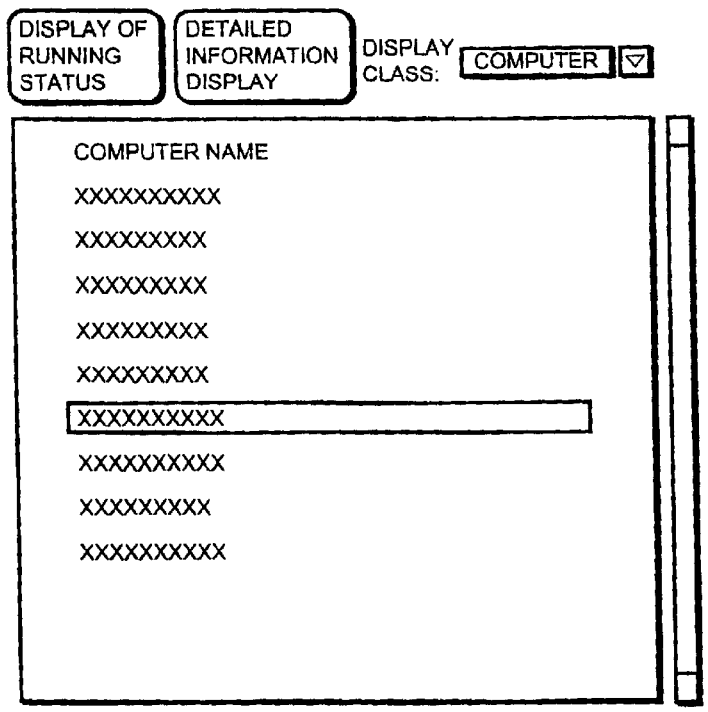
FIG. 24 shows an example of a screen for selecting a computer that executed a job of a job net judged to be one cause of delay out of job executing computers constituting the job system shown in FIG. 1.

FIG. 24 shows an example of a screen for selecting a computer that executed a job of a job net, judged to be a cause of delay, out of the job executing computers constituting the job system shown in FIG. 1. In this figure, similarly to FIG. 18, job executing computers that executed respective jobs of job nets, judged to be a cause of delay according to the process shown in FIGS. 10, 11 are highlighted, for example, by changing their color. In this screen, when a highlighted job executing computer is selected, is started the procedure shown in FIG. 16 for displaying, to an operator, a delay source of a job of a job net judged to be a cause of delay, from the aspect of the resource usage of the selected job executing computer, or the procedure shown in FIG. 19 for displaying, to an operator, a delay source from the aspect of traffic of the network used in executing that job. By using the display screen shown in FIG. 24, it is easy to select a computer to be examined on a cause of a bottleneck out of a plurality of highlighted computers, when a plurality of job nets are evaluated.

As described above, according to the present invention, in a job system in which computers are assigned respectively to a series of jobs constituting a job net, and the jobs are executed in a predetermined order in respective computers assigned to those jobs, it is possible to efficiently detect a causal location having generated delay in a business processing, in relation to the jobs.

Further, according to the present invention, in addition to the above effect, it is easy to specify capacity deficiency of computer or network resources or to specify jobs putting pressure on these resources, associating a problem of execution delay of a job with information on computer load or network traffic.

What is claimed is:

1. A method of specifying a delay factor, for specifying a delay factor in processing a job net executed by a computer system having a plurality of computers, wherein said method comprises:

a collecting step in which history information is collected from each computer assigned each of a series of jobs which are executed in a predetermined order and constitute said job net, said history information being information that can specify an execution start time at which said computer started execution of a job, and an execution time which the computer required to execute the job, from each computer; and a specifying step in which the delay factor in processing said job net is decided by comparing definition information, which is defined in advance and can specify a planned start time, a planned time at which execution of each job is started, and a planned execution time, a planned time required for execution of each job, with the history information collected, and said specifying step comprises:

a first step, in which a specific job is noticed in accordance with a predetermined rule;

a second step, for repeating a process in which, when an execution start time of said noticed job is delayed from a planned start time of said job by more than a predetermined degree, then, a job executed just prior to the noticed job in said order is noticed; and a third step, in which, with regard to each noticed job, when an execution time of said job exceeds a planned execution time of said job by a predetermined degree, said job is extracted as the delay factor in processing said job net.

2. The method of specifying a delay factor according to claim 1, wherein:

in said third step, when a certain job is extracted as the delay factor in processing said job net, a computer assigned to said job is further extracted as a delay factor in processing said job net.

3. The method of specifying a delay factor according to claim 1, wherein:

said history information is information that can specify an execution end time at which a computer ended execution of the job;

said definition information is information that can specify a planned end time, a planned time at which execution of each job is ended;

said specifying step further comprises:
- a fourth step, in which, when the execution start time of the noticed job is delayed from the planned start time by more than the predetermined degree, and when an execution end time of a job whose execution end time is latest among jobs executed just prior to said noticed job is not delayed from a planned end time by more than a predetermined degree, an interval between the noticed job and the job executed just prior to said noticed job is extracted as a delay factor in processing said job net.

4. The method of specifying a delay factor according to claim 6, wherein
in said fourth step,
when an interval between a certain job and a job executed just prior to said job is extracted as a delay factor in processing said job net, and when a computer assigned to said job is different from a computer assigned to the job executed just prior to said job, a network between said computers is further extracted as a delay factor in processing said job net.

5. A method of specifying a delay factor, for analyzing a delay factor in processing a job net executed by a computer system having a plurality of computers, wherein said method comprises:
- a collecting step in which history information is collected from each computer assigned each of a series of jobs which are executed in a predetermined order and constitute said job net, said history information being information that can specify an execution start time at which said computer started execution of a job, an execution end time at which said computer ended the execution of the job, and an execution time which the computer required to execute the job, and
- a specifying step in which the delay factor in processing said job net is decided by comparing definition information, which is defined in advance and can specify a planned start time, a planned time at which execution of each job is started, a planned end time, a planned time at which execution of each job is ended, and a planned execution time, a planned time required for execution of each job, with the history information collected, and said specifying step comprises:
- a first step, in which a specific job is noticed in accordance with a predetermined rule;
- a second step, for repeating a process in which, among jobs executed just prior to the noticed job in said order, jobs whose execution end times stand within n-th (n: a natural number) from the latest are extracted and noticed; and
- a third step, in which, with regard to each noticed job, when an execution time of said job exceeds a planned execution time of said job by a predetermined degree, said job is extracted as the delay factor in processing said job net.

6. The method specifying a delay factor according to claim 5, wherein:
in said second step,
when an execution start time of the noticed job is not delayed from a planned start time by more than a predetermined degree, the process of extracting and noticing the jobs whose execution end times stand within n-th (n: a natural number) from the latest among the jobs executed just prior to said noticed job in said order is not performed.

7. The method of specifying a delay factor according to claim 5, wherein:
in said third step,
when a certain job is extracted as the delay factor in processing said job net, a computer assigned to said job is further extracted as a delay factor in processing said job net.

8. The method of specifying a delay factor according to claim 5, wherein:
said specifying step further comprises:
- a fourth step, in which, when the execution start time of the noticed job is delayed from the planned start time by more than the predetermined degree, and when an execution end time of a job whose execution end time is latest among jobs executed just prior to said noticed job is not delayed from a planned end time by more than a predetermined degree, an interval between the noticed job and the job executed just prior to said noticed job is extracted as a delay factor in processing said job net.

9. The method of specifying a delay factor according to claim 8, wherein:
in said fourth step, in a case where an interval between a certain job and a job executed just prior to said job is extracted as a delay factor in processing said job net, when a computer assigned to said job is different from a computer assigned to the job executed just prior to said job, a network between said computers is further extracted as a delay factor in processing said job net.

10. A method of specifying a delay factor, for specifying a delay factor in processing a job net executed by a computer system having a plurality of computers, wherein said method comprises:
- a collecting step in which history information is collected from each computer assigned each of a series of jobs which are executed in a predetermined order and constitute said job net, said history information expressing a history of executing a job which constitutes said job net and is assigned to said computer;
- a specifying step in which a job and a computer assigned to said job that became the delay factors in processing said job net are decided, on the basis of a form of delay in execution of each of said series of jobs constituting said job net, expressed by said history information collected, in relation to an execution schedule of each of said series of jobs constituting said job net, expressed in definition information defined in advance, and in accordance with computers assigned to each of said series of jobs;
- a computer utilization status acquiring step in which a resource utilization status owing to each process executed in said computer to which the job became the delay factor in processing said job net is assigned is acquired, from said computer;
- a process specifying step in which a process is specified as an execution form of the job that became the delay factor in processing said job net, on the computer to which said job is assigned, and a computer utilization status of said computer owing to the process of the job that became the delay factor in processing said job net is specified, among resource utilization statuses owing to respective processes acquired from the computer to which the job that became the delay factor in processing said job net is assigned; and a computer utilization status displaying step in which a resource utilization status of the computer to which the job that became the delay factor in processing said job net is assigned is displayed, owing to each process, acquired from said computer, distinguishing, at least, the resource utilization status of said computer owing to the process specified with respect to the job that became the delay factor in processing said job net.

11. The method of specifying a delay factor according to claim 10, wherein:

in said process specifying step, it is further judged if the resource utilization status of the computer to which the job that became the delay factor in processing said job net is assigned, owing to each process, includes a resource utilization status corresponding to jobs other than the job that became the delay factor in processing said job net; and in said computer utilization status displaying step, when the resource utilization status of the computer to which the job that became the delay factor in processing said job net is assigned, owing to each process, includes a resource utilization status corresponding to jobs other than the job that became the delay factor in processing said job net, said definition information that is defined in advance for a job net including those jobs other than the job that became the delay factor, and expresses an execution schedule of each of a series of jobs constituting the job net in question, is further displayed.

12. The method of specifying a delay factor according to claim 10, wherein:

said definition information is information that can specify, for each job of the series of jobs constituting said job net, an execution schedule, which indicates a computer assigned to said job and a planned start time of execution, and a name of executable file that is executed by said computer to realize the execution of said job;

said resource utilization status of said computer owing to each process acquired from said computer is a resource utilization status of said computer for each executable file executed in said computer; and in said process specifying step, as information for specifying the process as the execution form of the job that became the delay factor in processing said job net, on the computer to which said job is assigned, a name of an executable file associated with said job by said definition information is acquired; and out of resource utilization statuses of the computer to which the job that became the delay factor in processing said job net is assigned, i.e., respective resource utilization statuses owing to executable files, acquired from said computer, a resource utilization status owing to the executable file of the job that became the delay factor in processing said job net is specified.

13. A method of specifying a delay factor, for specifying a delay factor in processing a job net executed by a computer system having a plurality of computers, wherein said method comprises:

a collecting step in which history information is collected from each computer assigned each of a series of jobs-which are executed in a predetermined order and constitute said job net, said history information expressing a history of executing a job which constitutes said job net and is assigned to said computer;

a specifying step in which a job and a computer assigned to said job that became the delay factors in processing said job net are decided, on the basis of a form of delay in execution of each of said series of jobs constituting said job net, expressed by said history information collected, in relation to an execution schedule of each of said series of jobs constituting said job net, expressed in definition information defined in advance, and in accordance with computers assigned to each of said series of jobs;

a network specifying step in which a process is specified as an execution form of the job that became the delay factor in processing said job net, on the computer to which said job is assigned, and a part of the network to which a logical channel used by the specified process is set is specified;

a traffic status collecting step in which a traffic status in the specified network is collected, for each logical channel set to said network; and a traffic status displaying step in which the traffic status collected for said each logical channel is displayed, distinguishing, at least, a traffic status of the logical channel used by the process specified to the job that became the delay factor in processing said job net.

14. The method of specifying a delay factor according to claim 13, wherein:

said method further comprises:

a step in which if, as the traffic status collected for said each logical channel, a traffic status of a logical channel used by a process corresponding to a job other than the job that became the delay factor in processing said job net is included or not is judged; and in said traffic status displaying step, when a traffic status of a logical channel used by a process corresponding to a job other than the job that became the delay factor in processing said job net is included as the traffic status collected for said each logical channel, said definition information, which is defined in advance for a job net including the job other than the job that became the delay factor in processing said job net and expresses en execution schedule of each of a series of jobs constituting said job net, is further displayed.

15. The method of specifying a delay factor according to claim 13, wherein:

in said network specifying step, for each job of the series of jobs constituting said job net, a relation of a process as an execution form on a computer to a logical channel used by said process and a relation to a part of the network to which said logical channel is set are defined in advance, so as to specify a part of the network to which the logical channel used by the process of the job that became the delay factor in processing said job net is set.

16. A method of specifying a delay factor, for specifying a delay factor in processing a job net executed by a computer system having a plurality of computers, wherein said method comprises:

a collecting step in which history information is collected from each computer assigned each of a series of jobs which are executed in a predetermined order and constitute said job net, said history information expressing a history of executing a job which constitutes said job net and is assigned to said computer;

a specifying step in which a job and a computer assigned to said job that became the delay factors in processing said job net are decided, on the basis of a form of delay in execution of each of said series of jobs constituting said job net, expressed by said history information collected, in relation to an execution schedule of each of said series of jobs constituting said job net, expressed in definition information defined in advance, and in accordance with computers assigned to each of said series of jobs;

a computer utilization status acquiring step in which a resource utilization status owing to each process executed in said computer to which the job became the delay factor in processing said job net is assigned is acquired, from said computer;

a load judging process, in which it is judged if the resource utilization status of the computer to which the job that became the delay factor in processing said job net is assigned, owing to each process, acquired from said computer, implies a load of said computer as a whole exceeds a predetermined level or not, and, in a case of excess, it is judged if a resource utilization status owing to a process of a job which is set in advance as a job that can be executed in another computer among the jobs executed in said computer, is included as the acquired resource utilization status of said computer owing to said each process; and a changing step in which the definition information defined in advance for a job net including the job set in advance as a job that can be executed in another computer is changed, so that the process of said job is executed in said another computer.

17. A method of analyzing a delay factor, for analyzing a delay factor in processing a job net in a job system that uses a computer system having a plurality of computers connected through a network, assigns said computers respectively to a series of jobs constituting the job net, and executes the jobs in a predetermined order by the respective computers assigned to said jobs, to process said job net, wherein said method comprises:

a collecting step in which history information is collected from each computer, said history information being information that can specify an execution start time at which said computer started execution of a job, an execution end time at which said computer ended the execution of the job, and an execution time which the computer required to execute the job, and an analyzing step in which the delay factor in processing said job net is decided by comparing definition information, which is defined in advance and can specify a planned start time, a planned time at which execution of each job is started, a planned end time, a planned time at which execution of each job is ended, and a planned execution time, a planned time required for execution of each job, with the history information collected, and said analyzing step comprises:
a first step, in which a specific job is noticed in accordance with a predetermined rule;
a second step, for repeating a process in which, among jobs executed just prior to the noticed job in said order, jobs whose execution end times stand within nth (n: a natural number) from the latest are extracted and noticed; and
a third step, in which, with regard to each noticed job, when an execution time of said job exceeds a planned execution time of said job by a predetermined degree, said job is extracted as the delay factor in processing said job net, wherein:

in said second step,
when an execution start time of the noticed job is not delayed from a planned start time by more than a predetermined degree, the process of extracting and noticing the jobs whose execution end times stand within n-th (n: a natural number) from the latest among the jobs executed just prior to said noticed job in said order is not performed.

18. A method of analyzing a delay factor, for analyzing a delay factor in processing a job net in a job system that uses a computer system having a plurality of computers connected through a network, assigns said computers respectively to a series of jobs constituting the job net, and executes the jobs in a predetermined order by the respective computers assigned to said jobs, to process said job net, wherein said method comprises:

a collecting step in which history information is collected from each computer, said history information expressing a history of executing a job which constitutes said job net and is assigned to said computer;

an analyzing step in which a job and a computer assigned to said job that became the delay factors in processing said job net are decided, in accordance with a form of delay in execution of each of said series of jobs constituting said job net, expressed by said history information collected, in relation to an execution schedule of each of said series of jobs constituting said job net, expressed in definition information defined in advance, and in accordance with computers assigned to each of said series of jobs;

a computer utilization status acquiring step in which a resource utilization status owing to each process executed in said computer to which the job became the delay factor in processing said job net is assigned is acquired, from said computer;

a process specifying step in which a process is specified as an execution form of the job that became the delay factor in processing said job net, on the computer to which said job is assigned, and a computer utilization status of said computer owing to the process of the job that became the delay factor in processing said job net is specified, among resource utilization statuses owing to respective processes acquired from the computer to which the job that became the delay factor in processing said job net is assigned; and a computer utilization status displaying step in which a resource utilization status of the computer to which the job that became the delay factor in processing said job net is assigned is displayed, owing to each process, acquired from said computer, distinguishing, at least, the resource utilization status of said computer owing to the process specified with respect to the job that became the delay factor in processing said job net, wherein:
in said process specifying step,
it is further judged if the resource utilization status of the computer to which the job that became the delay factor in processing said job net is assigned, owing to each process, includes a resource utilization status corresponding to jobs other than the job that became the delay factor in processing said job net; and in said computer utilization status displaying step,
when the resource utilization status of the computer to which the job that became the delay factor in processing said job net is assigned, owing to each process, includes a resource utilization status corresponding to jobs other than the job that became the delay factor in processing said job net, said definition information that is defined in advance for a job net including those jobs other than the job that became the delay factor, and expresses an execution schedule of each of a series of jobs constituting the job net in question, is further displayed.

19. A method of analyzing a delay factor, for analyzing a delay factor in processing a job net in a job system that uses a computer system having a plurality of computers connected through a network, assigns said computers respectively to a series of jobs constituting the job net, and executes the jobs in a predetermined order by the respective computers assigned to said jobs, to process said job net, wherein said method comprises:

a collecting step in which history information is collected from each computer, said history information expressing a history of executing a job which constitutes said job net and is assigned to said computer;

an analyzing step in which a job and a computer assigned to said job that became the delay factors in processing said job net are decided, in accordance with a form of delay in execution of each of said series of jobs constituting said job net, expressed by said history information collected, in relation to an execution schedule of each of said series of jobs constituting said job net, expressed in definition information defined in advance, and in accordance with computers assigned to each of said series of jobs;

a computer utilization status acquiring step in which a resource utilization status owing to each process executed in said computer to which the job became the delay factor in processing said job net is assigned is acquired, from said computer;

a process specifying step in which a process is specified as an execution form of the job that became the delay factor in processing said job net, on the computer to which said job is assigned, and a computer utilization status of said computer owing to the process of the job that became the delay factor in processing said job net is specified, among resource utilization statuses owing to respective processes acquired from the computer to which the job that became the delay factor in processing said job net is assigned; and a computer utilization status displaying step in which a resource utilization status of the computer to which the job that became the delay factor in processing said job net is assigned is displayed, owing to each process, acquired from said computer, distinguishing, at least, the resource utilization status of said computer owing to the process specified with respect to the job that became the delay factor in processing said job net, wherein:
said definition information is information that can specify, for each job of the series of jobs constituting said job net, an execution schedule, which indicates a computer assigned to said job and a planned start time of execution, and a name of executable file that is executed by said computer to realize the execution of said job;

said resource utilization status of said computer owing to each process acquired from said computer is a resource utilization status of said computer for each executable file executed in said computer; and in said process specifying step,
as information for specifying the process as the execution form of the job that became the delay factor in processing said job net, on the computer to which said job is assigned, a name of an executable file associated with said job by said definition information is acquired; and out of resource utilization statuses of the computer to which the job that became the delay factor in processing said job net is assigned, respective resource utilization statuses owing to executable files, acquired from said computer, a resource utilization status owing to the executable file of the job that became the delay factor in processing said job net is specified.

20. A method of analyzing a delay factor, for analyzing a delay factor in processing a job net in a job system that uses a computer system having a plurality of computers connected through a network, assigns said computers respectively to a series of jobs constituting the job net, and executes the jobs in a predetermined order by the respective computers assigned to said jobs, to process said job net, wherein said method comprises:

a collecting step in which history information is collected from each computer, said history information expressing a history of executing a job which constitutes said job net and is assigned to said computer;

an analyzing step in which a job and a computer assigned to said job that became the delay factors in processing said job net are decided, in accordance with a form of delay in execution of each of said series of jobs constituting said job net, expressed by said history information collected, in relation to an execution schedule of each of said series of jobs constituting said job net, expressed in definition information defined in advance, and in accordance with computers assigned to each of said series of jobs;

a network specifying step in which a process is specified as an execution form of the job that became the delay factor in processing said job net, on the computer to which said job is assigned, and a part of the network to which a logical channel used by the specified process is set is specified;

a traffic status collecting step in which a traffic status in the specified network is collected, for each logical channel set to said network; and a traffic status displaying step in which the traffic status collected for said each logical channel is displayed, distinguishing, at least, a traffic status of the logical channel used by the process specified to the job that became the delay factor in processing said job net, wherein:
in said network specifying step,
for each job of the series of jobs constituting said job net, a relation of a process as an execution form on a computer to a logical channel used by said process and a relation to a part of the network to which said logical channel is set are defined in advance, so as to specify a part of the network to which the logical channel used by the process of the job that became the delay factor in processing said job net is set.

* * * * *